US012785956B1

(12) United States Patent
Shub

(10) Patent No.: US 12,785,956 B1
(45) **Date of Patent: *Nov. 3, 2026**

(54) METHOD AND SYSTEM FOR CLIENT-SIDE ARTIFICIAL INTELLIGENCE PROCESSING WITH END-TO-END ENCRYPTION IN WEB BROWSERS

(71) Applicant: Particular Ltd, Raanana (IL)

(72) Inventor: Arnon Shub, Raanana (IL)

(73) Assignee: Particular Ltd (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/636,972

(22) Filed: Apr. 2, 2026

Related U.S. Application Data

(63) Continuation of application No. 19/409,717, filed on Dec. 4, 2025, now Pat. No. 12,665,758.

(51) Int. Cl.
*H04L 9/08* (2006.01)
*H04L 9/06* (2006.01)

(52) U.S. Cl.
CPC ............ *H04L 9/088* (2013.01); *H04L 9/0643* (2013.01)

(58) Field of Classification Search
None
See application file for complete search history.

(56) References Cited

U.S. PATENT DOCUMENTS 10,567,369 B2 ‡ 2/2020 Scott et al.
10,728,017 B2 ‡ 7/2020 Bent et al.
(Continued)

OTHER PUBLICATIONS

W3C, "WebAssembly Specification Version 1.0," World Wide Web Consortium, Mar. 5, 2019, pp. 1-120, https://www.w3.org/TR/wasm-core-1/, accessed on Nov. 10, 2025, Geneva, Switzerland.‡
(Continued)

*Primary Examiner* — Philip J Chea
*Assistant Examiner* — James Ross Hollister
(74) *Attorney, Agent, or Firm* — Dhiraj Jindal; PATENT YOGI LLC

(57) ABSTRACT

A method and system for solving the technical problem of incompatibility between end-to-end encryption and artificial intelligence processing by transforming web browser architecture to enable secure AI operations without server-side decryption. The invention implements mandatory header validation (COOP/COEP/HSTS/Origin Isolation), WebAssembly sandboxing with dual-phase import control and signed attestation, bounded plaintext windows ($T \leq 1000$ ms) with automatic emergency wiping, and NIST SP 800-88 compliant multi-pass memory clearing with XOR verification. GPU acceleration with zero-copy transfer and mandatory clearing achieves practical performance. HMAC audit chains ($H_n$=HMAC_k $H_{n-1}$||event||nonce||timestamp)) provide regulatory compliance verification. Non-extractable keys bound to WebAuthn/FIDO2 ensure user control. The invention enables organizations to use advanced AI models (GPT-4, Claude, Gemini) with regulated data (HIPAA, PCI-DSS, GDPR) while maintaining full regulatory compliance through technical rather than contractual controls, eliminating the need for Business Associate Agreements in certain deployment models.

16 Claims, 15 Drawing Sheets

(56) References Cited

U.S. PATENT DOCUMENTS

| | | | | |
|---|---|---|---|---|
| 11,196,541 | B2 ‡ | 12/2021 | Williams et al. | |
| 11,470,053 | B2 ‡ | 10/2022 | Karame et al. | |
| 11,924,348 | B2 ‡ | 3/2024 | Manevich et al. | |
| 11,936,784 | B2 * | 3/2024 | Payne | H04L 9/0877 |
| 11,991,280 | B2 ‡ | 5/2024 | Leggette et al. | |
| 12,093,977 | B2 ‡ | 9/2024 | Eich et al. | |
| 2014/0229729 | A1 * | 8/2014 | Roth | H04L 67/1097 713/153 |
| 2023/0134072 | A1 * | 5/2023 | Eich | G06F 3/013 705/14.41 |
| 2025/0077611 | A1 * | 3/2025 | Balko | G06F 21/128 |

OTHER PUBLICATIONS

W3C, "Web Cryptography API," W3C Recommendation, Jan. 26, 2017, pp. 1-108, https://www.w3.org/TR/WebCryptoAPI/, accessed on Nov. 10, 2025, Geneva, Switzerland.‡

Onnx Runtime Team, "Running ONNX models in the browser," Microsoft Corporation Documentation, 2023, pp. 1-45, https://onnxruntime.ai/docs/tutorials/web/, accessed on Nov. 10, 2025, Redmond, WA, USA.‡

Reis, Charles; Moshchuk, Alexander; Oswal, Nasko, "Site Isolation: Process Separation for Web Sites within the Browser," Proceedings of the 28th Usenix Security Symposium, Aug. 14-16, 2019, pp. 1661-1678, https://www.usenix.org/conference/usenixsecurity19/presentation/reis, accessed on Nov. 10, 2025, Santa Clara, CA, USA.‡

TensorFlow.js Team, "TensorFlow.js: Machine Learning for the Web and Beyond," arXiv preprint arXiv:1901.05350, Jan. 16, 2019, pp. 1-9, https://arxiv.org/abs/1901.05350, accessed on Nov. 10, 2025, Cornell University, Ithaca, NY, USA 1.‡

USPTO, "2024 Guidance Update on Patent Subject Matter Eligibility, including on Artificial Intelligence," United States Patent and Trademark Office, Jul. 17, 2024, pp. 1-42, https://www.uspto.gov/patents/laws/examination-policy/subject-matter-eligibility, accessed on Nov. 10, 2025, Alexandria, VA, USA.‡

W3C, "Secure Contexts," W3C Candidate Recommendation, Sep. 15, 2021, pp. 1-28, https://www.w3.org/TR/secure-contexts/, accessed on Nov. 10, 2025, Geneva, Switzerland.‡

W3C, "Web Authentication: An API for accessing Public Key Credentials Level 2," W3C Recommendation, Apr. 8, 2021, pp. 1-145, https://www.w3.org/TR/webauthn-2/, accessed on Nov. 10, 2025, Geneva, Switzerland.‡

Fido Alliance, "Client to Authenticator Protocol (CTAP) version 2.1," FIDO Alliance Proposed Standard, Jun. 15, 2021, pp. 1-180, https://fidoalliance.org/specs/fido-v2.1-ps-20210615/fido-client-toauthenticator-protocol-v2.1-ps-20210615.html, accessed on Nov. 10, 2025, Wakefield, MA, USA.‡

Barnes, Richard; Beurdouche, Benjamin; Robert, Raphael; Millican, Jon; Omara, Emad; Cohn-Gordon, Katriel, "RFC 9420: The Messaging Layer Security (MLS) Protocol," Internet Engineering Task Force (IETF), Mar. 2023, pp. 1-132, https://datatracker.ietf.org/doc/html/rfc9420, accessed on Nov. 10, 2025, Fremont, CA, USA.‡

Kissel, Richard; Regenscheid, Andrew; Scholl, Matthew; Stine, Kevin, "NIST Special Publication 800-88 Revision 1: Guidelines for Media Sanitization," National Institute of Standards and Technology, Dec. 2014, pp. 1-77, https://nvlpubs.nist.gov/nistpubs/SpecialPublications/NIST.SP.800-88r1.pdf, accessed on Nov. 10, 2025, Gaithersburg, MD, USA.‡

W3C, "WebAssembly Core Specification, Section 7: Security Considerations," World Wide Web Consortium, Dec. 5, 2024, pp. 1-15, https://www.w3.org/TR/wasm-core-1/#security, accessed on Nov. 10, 2025, Geneva, Switzerland.‡

OWASP Foundation, "OWASP Top 10—2021, A08:2021—Software and Data Integrity Failures," Open Web Application Security Project, 2021, pp. 1-8, https://owasp.org/Top10/A08_2021-Software_and_Data_Integrity_Failures/, accessed on Nov. 10, 2025, Columbia, MD, USA.‡

Nvidia Corporation, "Cuda C++ Best Practices Guide, Version 12.x, Chapter 9: GPU Memory Management and Security," NVIDIA Developer Documentation, 2024, pp. 85-112, https://docs.nvidia.com/cuda/cuda-c-best-practices-guide/, accessed on Nov. 10, 2025, Santa Clara, CA, USA.‡

Barth, Adam; Jackson, Collin; Reis, Charles, "The Security Architecture of the Chromium Browser," Stanford University Computer Science Technical Report, 2008, pp. 1-14, https://crypto.stanford.edu/websec/chromium/, accessed on Nov. 18, 2025, Stanford, CA, USA.‡

W3C, "WebGPU," W3C Working Draft, Aug. 2024, Section 18 Security, pp. 1-25, https://www.w3.org/TR/webgpu/#security, accessed on Nov. 18, 2025, Geneva, Switzerland.‡

Kocher, Paul; Horn, Jann; Fogh, Anders; Genkin, Daniel; Gruss, Daniel; Haas, Werner; Hamburg, Mike; Lipp, Moritz; Mangard, Stefan; Prescher, Thomas; Schwarz, Michael; Yarom, Yuval, "Spectre Attacks: Exploiting Speculative Execution," 2019 IEEE Symposium on Security and Privacy, May 2019, pp. 1-19, https://spectreattack.com/spectre.pdf, accessed on Nov. 18, 2025, San Francisco, CA, USA.‡

The correct reference for that work is the Usenix Security 2022 paper "Provably-Safe Multilingual Software Sandboxing using WebAssembly." I will update Reference B4 in the IDS to use the Usenix Security citation and URL (e.g., https://www.usenix.org/conference/usenixsecurity22/presentation/bosamiya ) instead of the nonresolving DOI.‡

TensorFlow.js Team, "TensorFlow.js: Machine Learning for the Web and Beyond," arXiv preprint arXiv: 1901.05350, Jan. 16, 2019, pp. 1-9, https://arxiv.org/abs/1901.05350, accessed on Nov. 10, 2025, Cornell University, Ithaca, NY, USA.

* cited by examiner
‡ imported from a related application

1500

| Security Property | Tier 1 | Tier 2 | Tier 3 | Tier 4 |
|---|---|---|---|---|
| Encrypted data-at-rest | ✓ AES-256-GCM | ✓ AES-256-GCM | ✓ AES-256-GCM | ✓ AES-256-GCM |
| Non-extractable keys | ✓ Hardware-bound | ✓ Hardware-bound | ✓ Hardware-bound | ✓ Hardware-bound |
| Bounded plaintext window | ≤1000ms | ≤800ms | ≤500ms | ≤300ms |
| Emergency wipe SLA | ≤15ms | ≤15ms | ≤15ms | ≤15ms |
| XOR memory verification | ✓ 3-pass | ✓ 3-pass | ✓ 3-pass | ✓ 3-pass |
| HMAC audit chain | ✓ | ✓ | ✓ | ✓ |
| PASS/FAIL header enforcement | ✓ | ✓ | ✓ | ✓ |
| Guard pages | ✓ | ✓ | ✓ | ✓ |
| Dual-phase WASM validation | ✓ | ✓ | ✓ | ✓ |

FIG. 15

METHOD AND SYSTEM FOR CLIENT-SIDE ARTIFICIAL INTELLIGENCE PROCESSING WITH END-TO-END ENCRYPTION IN WEB BROWSERS

REFERENCE TO RELATED APPLICATIONS

This application is a continuation of U.S. patent application Ser. No. 19/409,717, titled "METHOD AND SYSTEM FOR CLIENT-SIDE ARTIFICIAL INTELLIGENCE PROCESSING WITHEND-TO-END ENCRYPTION IN WEB BROWSERS", filed on Dec. 4, 2025, which is incorporated by reference herein in its entirety.

FIELD OF THE INVENTION

The present invention relates generally to secure data processing systems, and more particularly to methods and systems for performing artificial intelligence operations on end-to-end encrypted data entirely within a web browser environment without server-side decryption.

BACKGROUND OF THE INVENTION

The proliferation of artificial intelligence (AI) services has created unprecedented capabilities for data analysis, natural language processing, and pattern recognition. However, these services typically require users to upload their data to cloud servers for processing, creating fundamental security and privacy vulnerabilities that prevent their use with regulated data.

Current approaches to AI processing face several critical limitations:

Regulatory Compliance Barriers: Advanced AI services (e.g., OpenAI GPT-4, Anthropic Claude, Google Gemini, etc.) typically do not provide Business Associate Agreements (BAAs) required for HIPAA compliance in standard deployment models, nor do they offer certifications for FINRA, PCI-DSS, or other regulatory frameworks.

Server-Side Processing Requirements: Traditional AI services require data to be transmitted to and processed on external infrastructure. Healthcare organizations cannot send Protected Health Information (PHI) to OpenAI, financial institutions cannot send customer data to Anthropic, and law firms handling sensitive cases cannot use cloud-based AI services.

Homomorphic Encryption: While theoretically allowing computation on encrypted data, homomorphic encryption suffers from computational overhead of 1000×-10000×, making it impractical for complex AI operations.

Local Installation Barriers: While organizations could theoretically download and run AI models locally, this requires significant technical expertise, computational resources, and ongoing maintenance.

Prior Art Limitations: While US20170180115A1 (Microsoft, 2015) described homomorphic encryption for cloud computing, and US20220004929A1 (Google, 2020) provided an on-device machine learning platform, neither enables the use of advanced third-party AI models with regulated data in a browser environment.

Browser-Based Machine Learning Prior Art: U.S. Pat. No. 12,093,977 (Brave Software, 2024) discloses a browser-based machine learning system enabling local model execution for privacy preservation. While Brave's approach provides benefits by avoiding server-side processing, it does not address the specific technical problem solved by the present invention: AI processing of encrypted regulated data with compliance guarantees. The Brave patent focuses on general-purpose ML inference in browsers but lacks critical elements required for regulated data processing: (1) no PASS/FAIL header validation with mandatory secure context prerequisites (COOP/COEP/HSTS/Origin Isolation) and reject paths essential for regulatory compliance frameworks; (2) no bounded plaintext windows (T≤1000 ms) with emergency wipe mechanisms required for preventing memory forensics attacks; (3) no dual-phase WASM attestation with cryptographic binding to audit chains necessary for proving compliance with data handling policies; (4) no XOR-verified memory clearing implementing NIST SP 800-88 mandated by regulatory frameworks for cryptographic material; and (5) no HMAC audit chains linking decryption, processing, re-encryption, and wiping operations required for regulatory audit documentation. The present invention uniquely combines browser-side AI processing with encrypted data lifecycle management, temporal security guarantees (T≤1000 ms), and cryptographic audit capabilities specifically designed to meet regulatory compliance requirements (HIPAA, PCI-DSS, FINRA, attorney-client privilege). Brave solves "run ML models locally for privacy"; the present invention solves the fundamentally different problem: "process AI operations on encrypted regulated data with provable compliance and cryptographic guarantees." The technical approaches, security architectures, and intended use cases are distinct.

Economic Impact: The inability to use AI with regulated data costs organizations billions annually in missed opportunities. Healthcare providers cannot use AI for diagnosis assistance, financial institutions cannot leverage AI for fraud detection on customer data, and law firms cannot use AI for case analysis.

Technical Challenges: Browser environments present unique challenges for secure AI processing. JavaScript's memory management, the lack of direct hardware access, and browser security policies all create barriers to implementing secure, high-performance AI operations.

Current Workarounds Are Inadequate: Organizations currently resort to manual processes, de-identification (which reduces data utility), or expensive on-premises installations. These workarounds are inefficient, costly, and often still fail to meet regulatory requirements.

The Browser as a Security Boundary: Modern web browsers implement sophisticated security models, including same-origin policy, content security policy, and sandboxing. However, these mechanisms were not designed for AI processing of encrypted data.

WebAssembly Promise and Limitations: WebAssembly provides near-native performance in browsers but lacks built-in security features for handling sensitive data. Existing WebAssembly implementations allow unrestricted imports that could lead to data exfiltration.

GPU Acceleration Challenges: While WebGPU and WebGL enable GPU acceleration in browsers, they were not designed with security requirements for processing encrypted data. GPU memory persists across operations, creating potential data leakage vectors.

Audit and Compliance Requirements: Regulatory frameworks require demonstrable proof of data protection. Current browser-based applications lack cryptographic audit trails that can prove compliance with data handling requirements.

Key Management Complexity: Secure key management in browser environments is challenging. The Web Crypto API provides cryptographic primitives but doesn't address key lifecycle management for regulatory compliance.

Memory Clearing Inadequacy: JavaScript's garbage collection is non-deterministic, making it impossible to guarantee when sensitive data is actually removed from memory. This creates compliance risks for regulated data processing.

Time-Based Security Requirements: Many security protocols require time-bounded operations, but JavaScript's event loop and asynchronous nature make enforcing strict temporal bounds challenging.

Prior Art Summary: Existing solutions either require server-side processing (violating E2EE), use impractical encryption schemes (homomorphic), or require complex local installations. No prior art enables browser-based AI processing of encrypted data with regulatory compliance.

Need for Innovation: There exists a critical need for a system that enables organizations to leverage advanced AI capabilities while maintaining end-to-end encryption, regulatory compliance, and practical performance, all within the familiar browser environment.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention overcomes the limitations of prior art by providing a method and system for performing artificial intelligence operations on end-to-end encrypted data entirely within a web browser environment without exposing decrypted data to external server infrastructure. The invention solves the specific technical problem of incompatibility between end-to-end encryption and AI processing through browser-level architectural transformations that override conventional browser behavior.

In one aspect, the invention provides a method comprising validating security headers including COOP, COEP, HSTS, and Origin Isolation as prerequisite conditions with PASS/FAIL enforcement; implementing dual-phase WebAssembly import validation comprising load-time pattern matching prohibiting categories including network operations (e.g., fetch, XMLHttpRequest, WebSocket, WebRTC), DOM access (e.g., document, window, navigator), code evaluation (e.g., eval, Function, importScripts), and persistent storage APIs (e.g., localStorage, indexedDB), with instantiation-time signed attestation; enforcing a bounded plaintext window $T \leq 1000$ milliseconds from decryption to re-encryption with automatic emergency wiping; establishing guard pages using unmapped memory regions and 64-byte cache-aligned buffers; performing verified multi-pass memory clearing per NIST SP 800-88 with 3-pass random-zero-random and XOR verification; generating cryptographic audit trails using HMAC chains with formula $H_n = \text{HMAC\_k}(H_{n-1} \| \text{event} \| \text{nonce} \| \text{timestamp})$; implementing zero-copy CPU→GPU tensor transfer with mandatory clearing within 100 ms; and utilizing non-extractable keys bound to WebAuthn/FIDO2 with scheduled rotation for forward secrecy.

In another aspect, the invention provides a system comprising a secure context validator enforcing prerequisite headers; a memory allocator implementing guard pages and cache alignment; a WebAssembly execution environment with dual-phase import validation and Security Monitor generating signed attestations; a bounded execution controller enforcing plaintext exposure windows with emergency wipe capability; a GPU acceleration module implementing zero-copy transfer with mandatory clearing; an audit chain generator creating tamper-evident logs; a cryptographic processor with non-extractable key storage; and a verified memory wipe module implementing NIST SP 800-88 compliance.

The invention achieves substantial advantages over prior art: enables use of non-BAA AI services (GPT-4, Claude, Gemini) with regulated data while maintaining full compliance; eliminates need for server infrastructure or local installation; provides cryptographically verifiable audit trails for regulatory compliance; achieves practical performance with significant reduction in total processing time compared to cloud solutions in representative internal, non-binding benchmarks; maintains user control through browser-based key management; and scales immediately without infrastructure investment.

The present invention constitutes a practical application providing concrete improvements to computer functionality. The claimed methods transform the web browser through platform-specific mechanisms, including cache-aligned memory structures, fault-intercepting guard pages, hardware-bound key storage, and measurable timing guarantees. Unlike conventional browsers, the invention achieves verifiable security properties through architectural modifications rather than policy enforcement, solving the specific technical problem of incompatibility between end-to-end encryption and AI processing without preempting encryption or AI fields generally. The transformation is evidenced by: (1) physical memory operations with NIST SP 800-88 verified clearing; (2) hardware integration with GPU and WebAuthn/FIDO2 devices; (3) measurable temporal guarantees ($T \leq 1000$ ms, emergency wipe$\leq 15$ ms, GPU clearing$\leq 100$ ms); and (4) platform-specific fault handling mechanisms, all of which constitute technical improvements to browser architecture not achievable through conventional security policies alone.

These and other features and advantages of the invention will become apparent from the following detailed description and accompanying drawings, which illustrate by way of example the features of the invention.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

FIG. 15 illustrates a table 1500 showing security properties across execution tiers, in accordance with some embodiments.

DETAILED DESCRIPTION OF THE INVENTION

The present invention will now be described in detail with reference to the accompanying drawings. The following description is provided to enable any person skilled in the art to make and use the invention and sets forth the best modes contemplated by the inventors for carrying out the invention. Various modifications will remain readily apparent to those skilled in the art.

Glossary of Terms and Acronyms

The following terms and acronyms are used throughout the detailed description:

COOP—Cross-Origin-Opener-Policy
COEP—Cross-Origin-Embedder-Policy
HSTS—HTTP Strict-Transport-Security
JSON—JavaScript Object Notation
CSV—Comma-Separated Values
WebAuthn—Web Authentication API, part of the FIDO2 standards
HKDF—HMAC-based Key Derivation Function
HKDF—SHA256-HMAC-based Key Derivation Function using SHA-256
WebGPU—Web Graphics API exposing GPU hardware to the web
WebGL—Web Graphics Library for 2D/3D graphics in browsers
WebAssembly/WASM—binary instruction format for a stack-based virtual machine
HIPAA—Health Insurance Portability and Accountability Act
PCI-DSS—Payment Card Industry Data Security Standard
GDPR—General Data Protection Regulation
CCPA—California Consumer Privacy Act FERPA—Family Educational Rights and Privacy Act
COPPA—Children's Online Privacy Protection Act
FISMA—Federal Information Security Modernization Act
AI—Artificial Intelligence
CPU—Central Processing Unit
GPU—Graphics Processing Unit
API/APIs—Application Programming Interface
DOM—Document Object Model
SIMD—Single Instruction, Multiple Data
TLS—Transport Layer Security (e.g., TLS 1.3)
HTTPS—Hypertext Transfer Protocol Secure
HMAC—Hash-based Message Authentication Code
SHA (e.g., SHA-256)—Secure Hash Algorithm
SHA-256—Secure Hash Algorithm 256-bit
NIST—National Institute of Standards and Technology
SP (in "NIST SP 800-88")—Special Publication
FIDO—Fast Identity Online
FIDO2—Fast Identity Online 2 (second-generation FIDO standard)
ECDSA—Elliptic Curve Digital Signature Algorithm
ECDSA-P256—Elliptic Curve Digital Signature Algorithm using the P-256 (NIST P-256) curve
WebRTC—Web Real-Time Communication
PQC—Post-Quantum Cryptography
FINRA—Financial Industry Regulatory Authority
PHI—Protected Health Information
POSIX—Portable Operating System Interface
XML—Extensible Markup Language
PDF—Portable Document Format Code Listings and Pseudocode: All code listings and examples presented herein are exemplary pseudocode illustrations only. Equivalent implementations using different programming languages, frameworks, software architectures, or computational approaches are expressly contemplated and fall within the scope of the claimed invention. The code examples serve to demonstrate enablement and are not limiting as to implementation details.

System Architecture

Figure 1:
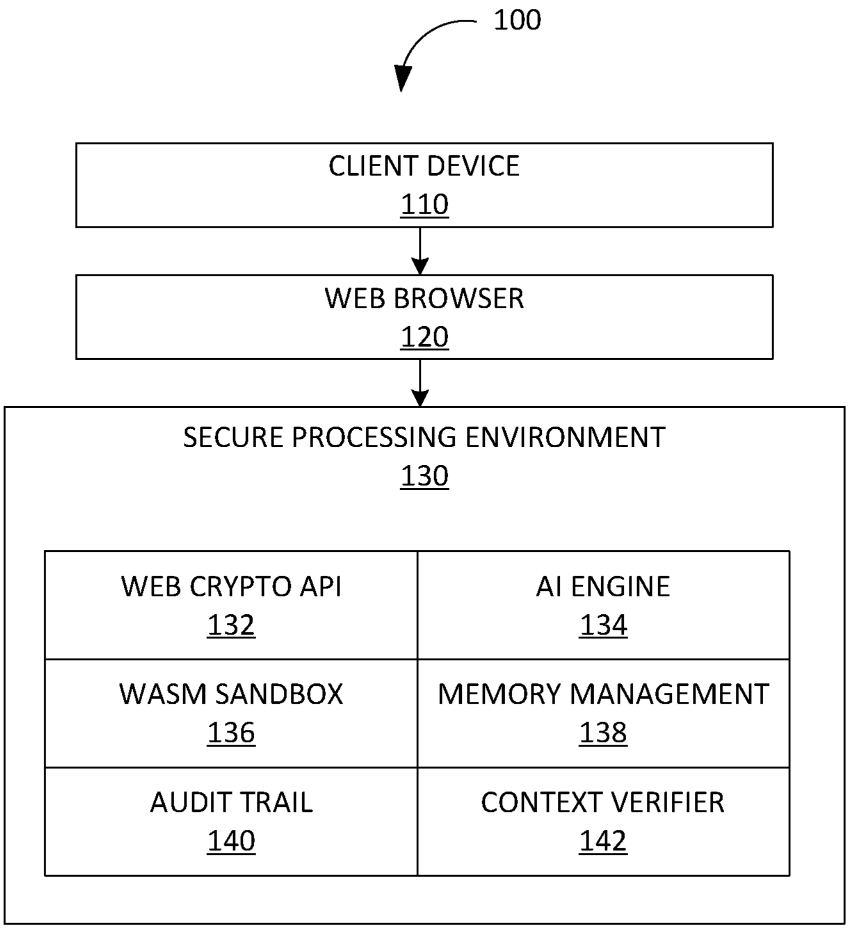
FIG. 1 illustrates an overall architecture of a system (100) showing client-side processing environment with a Client Device (110) executing a Web Browser (120) containing the Secure Processing Environment (130), demonstrating the integration of cryptographic and AI processing components within browser security boundaries, in accordance with some embodiments.

Referring to FIG. 1, the system architecture (100) comprises a Client Device (110) executing a Web Browser (120) containing a Secure Processing Environment (130). The Secure Processing Environment integrates Web Crypto API (132) for cryptographic operations, AI Engine (134) for inference processing, WASM Sandbox (136) for memory isolation, Memory Management (138) for secure allocation, Audit Trail (140) for compliance logging, and Context Verifier (142) for security enforcement.

The architecture transforms the browser from a passive content viewer into an active, secure computation platform capable of processing regulated data with cryptographic guarantees. This transformation occurs entirely client-side without requiring server infrastructure or third-party trust relationships.

Specific Improvement to Computer Functionality: The claimed combination constitutes a specific improvement in browser computer functionality—not achievable by routine or conventional browser operation—by (i) enforcing secure contexts as a mandatory prerequisite gate with PASS/FAIL flow, (ii) constraining plaintext lifetimes through bounded temporal windows with automatic emergency wiping, (iii) introducing dual-phase WebAssembly attestation with cryptographic proof generation, and (iv) implementing verified memory clearing with XOR validation per NIST SP 800-88. These technical mechanisms override default browser behavior to create a secure execution environment, enabling AI processing on encrypted data while maintaining regulatory compliance.

Security Header Validation and PASS/FAIL Enforcement

Figure 11:
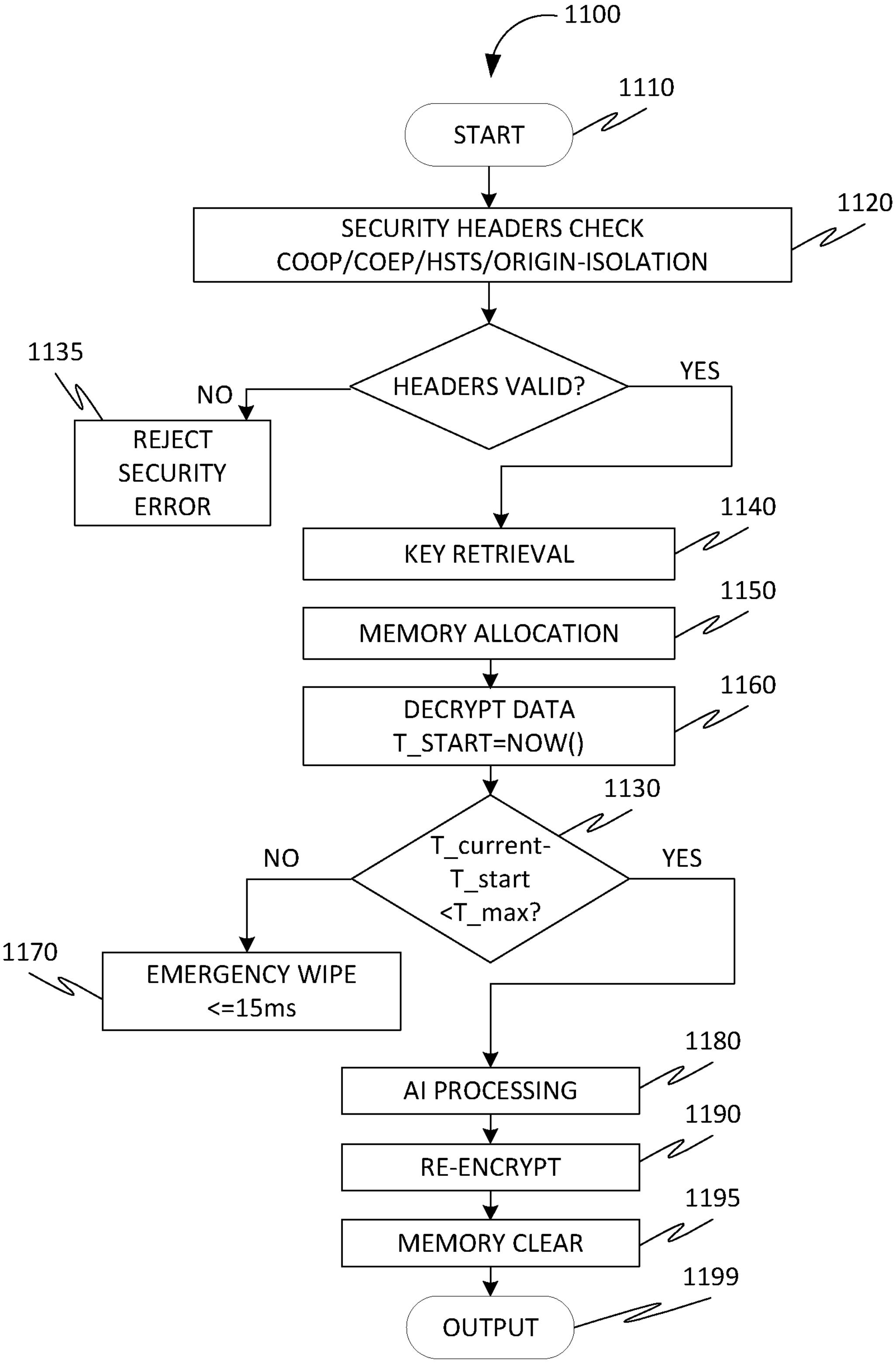
FIG. 11 depicts a complete PASS/FAIL enforcement flow (1100) showing Start (1110), Security Headers Check (1120) for COOP/COEP/HSTS/Origin Isolation, decision diamond for headers validity, REJECT path (1135) with security error for failed validation, Key Retrieval (1140), Memory Allocation (1150), Decrypt Data (1160) with T_START=NOW ( ) decision diamond (1130) checking "T_current-T_start<T_max?", EMERGENCY WIPE path (1170) for timeout violations, AI Processing (1180), Re-Encrypt (1190), Memory Clear (1195), and Output (1199), demonstrating the comprehensive security enforcement mechanism, in accordance with some embodiments.
Figure 12:
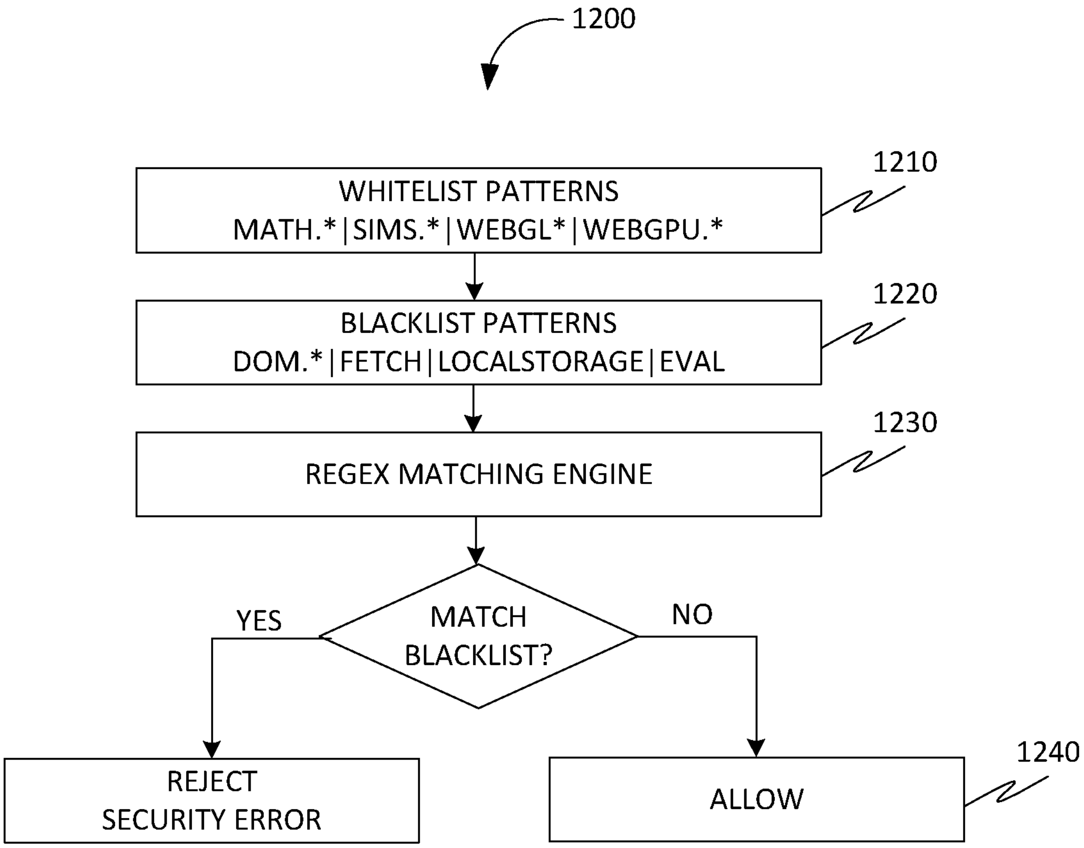
FIG. 12 illustrates a flow of import validation patterns (1200) showing Whitelist Patterns (1210) for Math., SIMD., WebGL., WebGPU., Blacklist Patterns (1220) for DOM., fetch., localStorage.*, Regex Matching Engine (1230), and Security Decision (1240) with immediate rejection of blacklisted patterns, in accordance with some embodiments.
Figure 13:
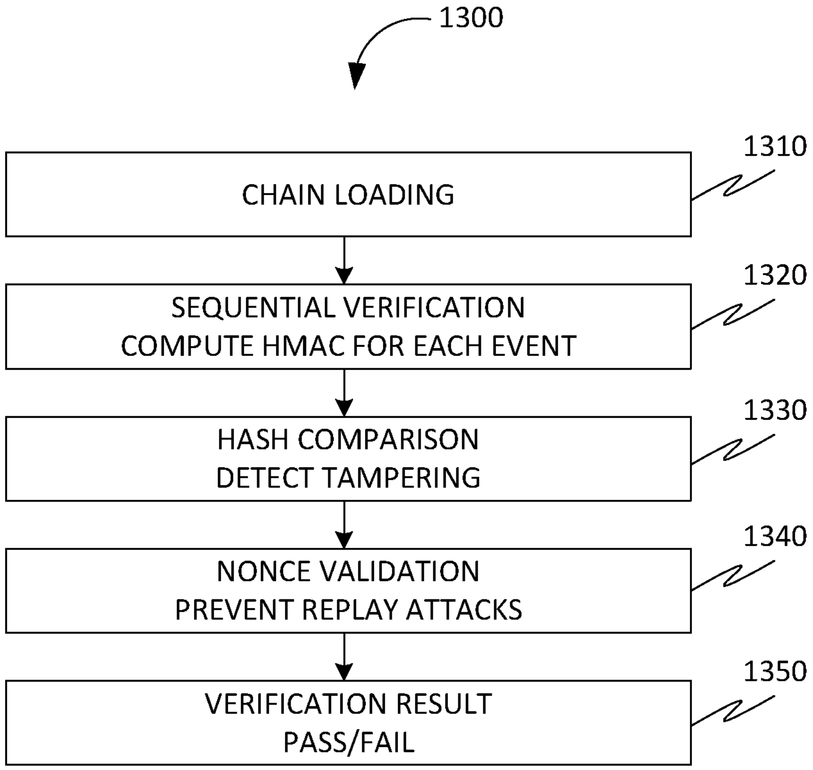
FIG. 13 shows an audit chain verification process (1300) illustrating Chain Loading (1310), Sequential Verification (1320) computing HMAC for each event, Hash Comparison (1330) detecting tampering, Nonce Validation (1340) preventing replay attacks, and Verification Result (1350) with pass/fail status, in accordance with some embodiments.
Figure 14:
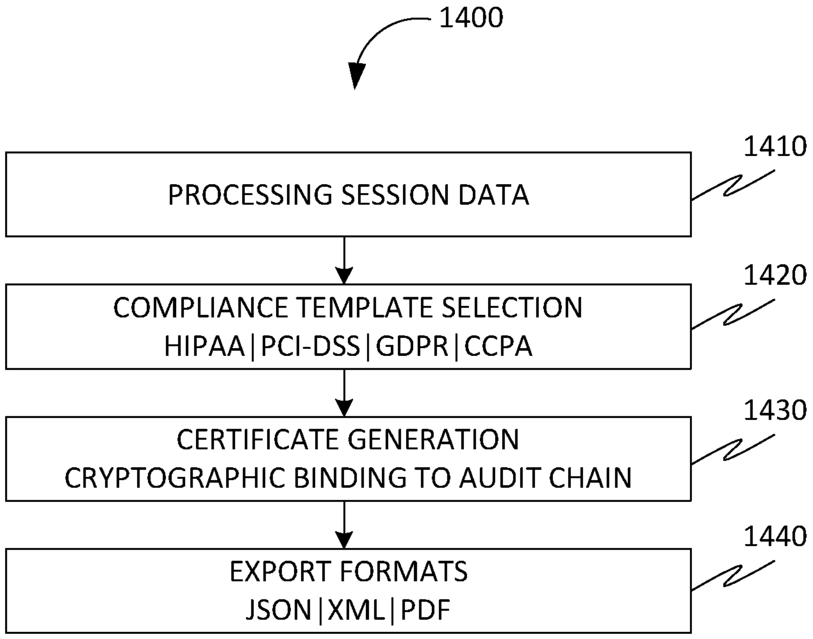
FIG. 14 depicts a compliance documentation generation system (1400) showing Processing Session Data (1410), Compliance Template Selection (1420) for HIPAA/PCI-DSS/GDPR/CCPA, Certificate Generation (1430) with cryptographic binding to audit chain, and Export Formats (1440) in regulatory-specific schemas, in accordance with some embodiments.

Referring to FIG. 11, the system implements mandatory security header validation (element 1120) as the first gate in the PASS/FAIL enforcement flow. The validation checks:

- Cross-Origin-Opener-Policy (COOP) set to "same-origin", preventing window references across origins
- Cross-Origin-Embedder-Policy (COEP) set to "require-corp" (or "credentialless" in browsers supporting modern relaxed isolation modes), enabling SharedArrayBuffer and high-precision timers
- Strict-Transport-Security (HSTS) with max-age≥31536000 (1 year) enforcing HTTPS
- Origin Isolation via browser policy or equivalent mechanism, ensuring process-level separation PASS/FAIL Flow Implementation: If any header validation fails, the system immediately executes the REJECT path (element 1135 in FIG. 11), terminating all processing and generating an audited security error event. Only upon successful validation (PASS) does the system proceed to Key Retrieval (element 1140) and subsequent processing steps.

Reduced-Capability Mode for Limited Browser Support: In browsers lacking Origin Isolation or full COEP support (e.g., certain Safari versions), the system enforces a reduced-capability mode disabling GPU kernels that fail PASS/FAIL prerequisites, while maintaining bounded plaintext windows (T≤1000 ms) and verified memory wiping on CPU/WASM execution paths. This graceful degradation preserves core security guarantees (steps a-i of claim 1) while adapting to browser-specific limitations, ensuring enablement across heterogeneous browser environments without compromising fundamental security properties.

Hierarchical Fallback Chain for Cross-Browser Compatibility: The system implements a deterministic capability detection and fallback mechanism ensuring consistent security guarantees across heterogeneous browser environments. Upon initialization, the runtime performs hierarchical capability assessment and selects the optimal execution tier while maintaining invariant security properties.

Execution Tier Definitions: TIER 1 (Full Capability):

- WebGPU with compute shader support
- SharedArrayBuffer with cross-origin isolation
- WebAssembly SIMD instructions
- SubtleCrypto non-extractable keys
- Maximum plaintext window: T≤1000 ms
- GPU acceleration: Enabled
- Performance factor: Baseline (1.0×)

TIER 2 (Reduced GPU):

- WebGL 2.0 with floating-point textures
- SharedArrayBuffer with cross-origin isolation
- WebAssembly SIMD instructions
- SubtleCrypto non-extractable keys
- Maximum plaintext window: T≤800 ms (tighter bound compensating for WebGL security model)
- GPU acceleration: WebGL fallback
- Performance factor: 0.6-0.8×

TIER 3 (CPU-SIMD Only):

- WebAssembly SIMD instructions
- SubtleCrypto non-extractable keys
- Maximum plaintext window: T≤500 ms (tighter bound compensating for lack of hardware isolation)
- GPU acceleration: Disabled
- Performance factor: 0.3-0.5×

TIER 4 (Minimum Viable):
- WebAssembly MVP (without SIMD)
- SubtleCrypto basic operations
- Maximum plaintext window: T≤300 ms (strictest bound for maximum security)
- GPU acceleration: Disabled
- Performance factor: 0.2-0.3×

Security Guarantee Equivalence: All execution tiers maintain the following invariant security properties regardless of capability level, as shown in FIG. 15.

The progressively tighter plaintext window bounds in lower tiers compensate for reduced hardware isolation by minimizing the temporal attack surface. This ensures that even browsers with partial API support (e.g., Safari without SharedArrayBuffer, Firefox without WebGPU) can execute the invention securely, albeit with reduced performance, thereby enabling broad deployment across heterogeneous environments without compromising fundamental security properties required for regulatory compliance.

Fallback Chain Implementation Pseudocode:

```
javascript
class RuntimeCapabilityDetector
async initialize( ) {
// Phase 1: Detect available APIs
const capabilities =
webgpu: await this.detectWebGPU( ),
webgl2: this.detectWebGL2( ),
sharedArrayBuffer: typeof SharedArrayBuffer !== 'undefined',
wasmSimd: await this.detectWasmSimd( ),
subtleCrypto: window.crypto?.subtle !== undefined,
crossOriginIsolated: self.crossOriginIsolated === true
};
// Phase 2: Verify security prerequisites
if (!capabilities.subtleCrypto) {
throw new SecurityError("SubtleCrypto required - cannot proceed");
}
if (!capabilities.crossOriginIsolated) {
console. warn("Cross-origin isolation unavailable - SharedArrayBuffer disabled");
capabilities.sharedArrayBuffer = false;
}
/ Phase 3: Select optimal execution tier
let tier, maxPlaintextWindow, gpuEnabled;
if (capabilities.webgpu && capabilities.sharedArrayBuffer &&
capabilities.wasm Simd) {
tier = "TIER_1_FULL";
maxPlaintextWindow = 1000; // ms
gpuEnabled = true;
console.log("Runtime: TIER 1 (Full Capability) – WebGPU + SIMD +
SharedArrayBuffer");
} else if (capabilities.webgl2 && capabilities.wasmSimd) {
tier = "TIER_2_REDUCED_GPU";
maxPlaintextWindow = 800; // ms - tighter bound for WebGL
gpuEnabled = true;
console.warn("Runtime: TIER 2 (Reduced GPU) - WebGL fallback");
this.auditChain.addEvent({
type: 'TIER_FALLBACK',
from: 'TIER_1', to: 'TIER_2',
reason: 'WebGPU unavailable',
capabilities: capabilities
});
} else if (capabilities.wasmSimd) { tier = "TIER_3_CPU_SIMD";
maxPlaintextWindow = 500; // ms - tighter bound for CPU-only
gpuEnabled = false;
console.warn("Runtime: TIER 3 (CPU-SIMD Only) - No GPU acceleration");
this.auditChain.addEvent({
type: 'TIER_FALLBACK',
from: 'TIER_2', to: 'TIER_3',
reason: 'GPU unavailable', capabilities: capabilities
});
} else {
tier = "TIER_4_MINIMUM";
maxPlaintextWindow = 300; // ms - strictest bound
gpuEnabled = false;
console.warn("Runtime: TIER 4 (Minimum Viable) - WASM MVP only");
this.auditChain.addEvent({
type: 'TIER_FALLBACK',
from: 'TIER_3', to: 'TIER_4',
reason: 'WASM SIMD unavailable', capabilities: capabilities
});
}
// Phase 4: Initialize security subsystems with tier-appropriate parameters
const memoryGuard = this.initializeMemoryGuard(tier);
const timingEnforcer =
this.initializePlaintextWindowEnforcer(maxPlaintextWindow); const auditLogger =
this.initializeHmacAuditChain( );
```

-continued

```
// Phase 5: Run self-test battery
const testResults = await this.runSecuritySelfTests(tier, capabilities); if
(testResults.anyFailure) {
throw new SecurityError( Self-test failed: ${testResults. failureReason}` );
}
return {
tier: tier,
capabilities: capabilities,
maxPlaintextWindow: maxPlaintextWindow, gpuEnabled: gpuEnabled,
attestation: this.generateCapabilityAttestation(capabilities, testResults)
};
}
async detectWebGPU( ) {
if (navigator.gpu === undefined) {
return { available: false, reason: "WebGPU API not present" };
}
try {
const adapter = await navigator.gpu.requestAdapter( );
if (adapter === null) {
return { available: false, reason: "No WebGPU adapter" };
}
const device = await adapter.requestDevice( ); const features =
Array.from(device.features);
return {
available: true, features: features, limits: device.limits
} catch (error) {
return { available: false, reason: error message };
}
}
detectWebGL2( ) {
const canvas = document.createElement('canvas'); const gl =
canvas.getContext('webgl2');
if (!gl) {
return { available: false, reason: "WebGL 2.0 not supported" };
}
// Check for floating-point texture support (required for ML operations)
const floatTextureExt = gl.getExtension('EXT_color_buffer_float');
return {
available: true,
floatTextures: floatTextureExt !== null,
maxTextureSize: gl.getParameter(gl.MAX_TEXTURE_SIZE)
};
}
async detectWasmSimd( ) {
// Feature detection via WASM module compilation with SIMD instructions
const simdTestBytes = new Uint8Array([
0x00, 0x61, 0x73, 0x6d, // WASM magic number
0x01, 0x00, 0x00, 0x00, // Version 1
// Type section with SIMD v128 type
0x01, 0x04, 0x01, 0x7b, 0x00, 0x7b,
// Function section
0x03, 0x02, 0x01, 0x00,
// Code section with SIMD instruction
0x0a, 0x09, 0x01, 0x07, 0x00, 0xfd, 0x0c, 0x00, 0x00, 0x0b
]);
try {
const module = await WebAssembly.compile(simdTestBytes); return { available: true
};
} catch (error) {
return { available: false, reason: "WASM SIMD not supported" };
}
}
async runSecuritySelfTests(tier, capabilities) { const results = {
memoryGuardTest: await this.testMemoryGuards( ), plaintextWindowTest: await
this.testPlaintextWindowEnforcement( ), auditChainTest: await
this. testAuditChainIntegrity( ),
clearingTest: await this.testMemoryClearing( ), anyFailure: false,
failureReason: null
};
// Check if any test failed
for (const [testName, testResult] of Object.entries(results)) {
if (testName === 'anyFailure' || testName === 'failureReason') continue; if
(!testResult.passed) {
results.anyFailure = true;
results.failureReason = ` ${testName} failed: ${testResult. reason}` ; break;
}
}
```

-continued

```
return results;
}
generateCapabilityAttestation(capabilities, testResults) { const attestation = {
timestamp: performance.now( ), capabilities: capabilities, testResults: testResults,
browserInfo: {
userAgent: navigator.userAgent, platform: navigator.platform, language:
navigator.language
}
};
// Generate SHA-256 hash of attestation
const attestationJson = JSON.stringify(attestation); const hash =
this.sha256(attestationJson);
// Sign with session key (HMAC)
const signature = this.hmac(this.sessionKey, hash);
return {
...attestation, hash: hash,
signature: signature
};
}
}
```

Code Disclaimer: The foregoing code is exemplary pseudocode only. Equivalent implementations using different programming languages, frameworks, or architectures are expressly contemplated and fall within the scope of the claimed invention.

Cross-Platform Compatibility Assurance: The fallback chain mechanism ensures that the invention operates reliably across diverse browser environments while maintaining identical security guarantees. For example, Safari 16.4+ without SharedArrayBuffer support automatically falls to TIER 3 with T≤500 ms. Firefox 115+ without WebGPU support falls to TIER 2 with WebGL and T≤800 ms. Chrome 113+ with full support operates at TIER 1 with T≤1000 ms. This adaptive approach prevents deployment barriers while ensuring that regulatory compliance requirements remain satisfied regardless of browser capabilities, addressing USPTO enablement requirements across the full scope of supported environments.

Code Implementation Example

```
javascript
class SecureContextValidator {
validate( ) {
const headers = {
coop: this. getHeader('Cross-Origin-Opener-Policy'), coep: this.getHeader('Cross-
Origin-Embedder-Policy'), hsts: this.getHeader('Strict-Transport-Security'), origin:
this.checkOriginIsolation( )
};
if (headers.coop !== 'same-origin' || headers.coep !== 'require-corp' ||
!this.validateHSTS(headers.hsts) ||
!headers.origin) {
this.auditChain.addEvent({
type: 'SECURITY_VALIDATION_FAILED',
headers: headers,
timestamp: performance.now( )
});
throw new SecurityError('Header validation failed - REJECT');
}
return true; // PASS
}
validateHSTS(hsts) {
const match = hsts?.match(/max-age-(\d+)/); return match && parseInt(match[1]) >=
31536000;
}
}
```

Code Disclaimer: The foregoing code is exemplary pseudocode only. Equivalent implementations using different programming languages, frameworks, or architectures are expressly contemplated and fall within the scope of the claimed invention.

This prerequisite validation ensures that all subsequent cryptographic operations occur within a secure context, preventing attacks via cross-origin communication, insecure transport, or inadequate process isolation.

Bounded Plaintext Window with Emergency Wipe

Referring to FIG. 11, elements 1160, 1130, and 1170, the system enforces a maximum plaintext exposure window T≤1000 milliseconds through continuous monitoring and automatic emergency wiping. FIG. 11 illustrates a complete PASS/FAIL enforcement flow with mandatory header validation (1120), decision points, emergency wipe paths (1170), and full processing sequence from start (1110) to output (1199). Operations associated with elements 1160 and 1190 are sensitive cryptographic operations. Operations associated with elements 1135 and 1170 are critical.

Temporal Enforcement Mechanism: Upon decryption (element 1160), the system records T_START=NOW( ) using performance.now( ) with microsecond precision. A monitoring loop executing every 100 ms via requestAnimationFrame continuously evaluates the condition shown in decision diamond 1130: "T_current-T_start<T_max?"

Emergency Wipe Sequence: If the plaintext window is exceeded (NO path from diamond 1130), the system immediately triggers the Emergency Wipe sequence (element 1170), which must complete within 15 ms as measured by monotonic clock (performance.now ( ), accounting for event-loop scheduling tolerance. This wipe sequence is also detailed in FIG. 10 (elements 1010-1050). The ≤15 ms SLA includes all three clearing passes plus XOR verification, with timing tolerance built-in per Implementation Notes as described herein, to ensure reliable operation across varying browser event-loop behaviors.

Implementation:

```
javascript
class PlaintextWindowEnforcer { constructor(maxWindow = 1000) {
this.maxWindow = maxWindow; this.decryptionStart = null; this.monitoringActive =
false;
}
startMonitoring( ) {
this.decryptionStart = performance.now( ); this.monitoringActive = true;
this.monitor( );
}
monitor( ) {
if (!this.monitoringActive) return;
const elapsed = performance.now( ) - this.decryption Start;
// Check decision diamond 1130: T_current - T_start < T_max?
if (elapsed >= this.max Window) {
// NO path - trigger emergency wipe (element 1170)
this.emergencyWipe( ); return;
}
// Warning at 90% threshold
if (elapsed >= this.maxWindow * 0.9) { this.auditChain.addEvent({
type: 'PLAINTEXT_WINDOW_WARNING',
elapsed: elapsed,
threshold: this.maxWindow
});
}
// Continue monitoring
requestAnimationFrame(( ) => this.monitor( ));
}
emergencyWipe( ) {
const wipeStart = performance.now( );
// Execute 15ms emergency sequence (FIG. 10, element 1030)
this.secureWipe.emergencyMultiPass( );
const wipeDuration = performance.now( ) - wipeStart;
this.auditChain.addEvent({
type: 'EMERGENCY_WIPE_TRIGGERED', reason: 'TIMEOUT_VIOLATION',
wipeDuration: wipeDuration, maxAllowed: 15
});
this.monitoringActive = false;
throw new SecurityError('Plaintext window exceeded - emergency wipe executed');
}
}
```

Code Disclaimer: The foregoing code is exemplary pseudocode only. Equivalent implementations using different programming languages, frameworks, or architectures are expressly contemplated and fall within the scope of the claimed invention.

Figure 2:
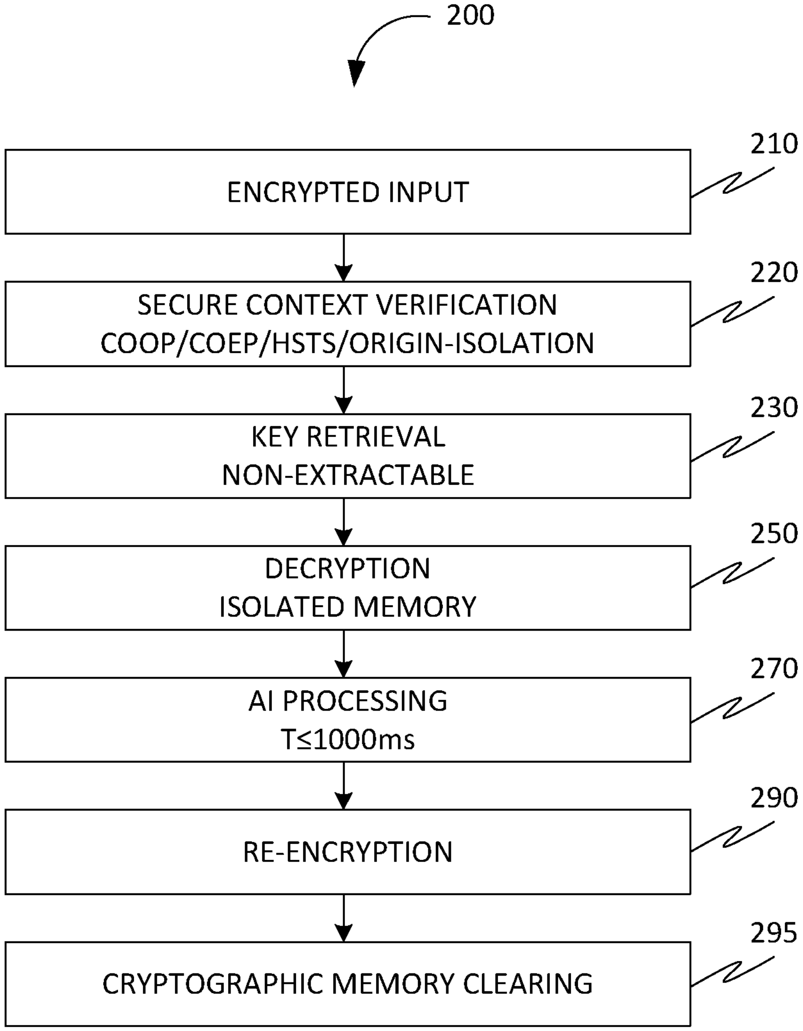
FIG. 2 depicts a detailed encryption/decryption process flow (200) with memory isolation boundaries, showing the sequential steps from encrypted input (210) through secure context verification (220), key operations (retrieval) (230), decryption within isolated memory (250), AI processing (270), re-encryption (290), and cryptographic memory clearing (295), in accordance with some embodiments.

Re-Encryption of Inference Outputs: All inference outputs generated during AI processing are re-encrypted prior to any persistence or transmission beyond the secure execution environment (FIG. 11, element 1190; FIG. 2, element 290). This ensures that plaintext data exists only within the bounded temporal window and is never stored or transmitted in unencrypted form. The re-encryption uses the same cryptographic keys and algorithms employed for initial encryption, maintaining end-to-end encryption throughout the entire processing lifecycle. See FIG. 2 (element 290) and FIG. 11 (element 1190) for the re-encryption stage executed prior to any persistence or transmission beyond the secure execution environment.

WebAssembly Dual-Phase Import Validation and Signed Attestation

Figure 3:
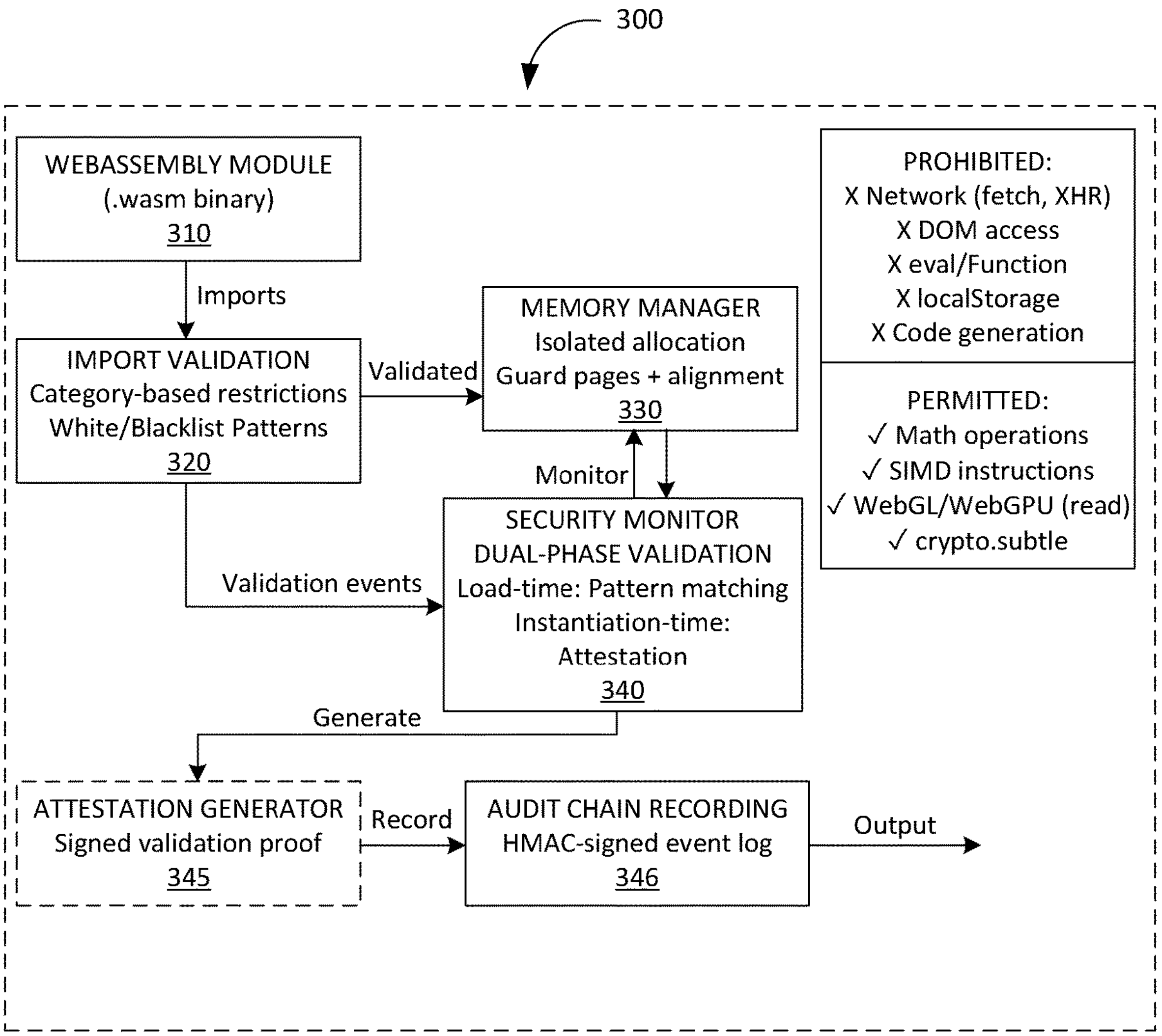
FIG. 3 shows an architecture of a WebAssembly sandbox (300) for AI model execution, illustrating the Web Assembly Module (310), Import Validation (320) with category-based restrictions and dual-phase validation, Memory Manager (330), Security Monitor (340) with dual-layer import validation, Attestation Generator (345) creating signed validation proofs, and Audit Chain Recording (346), demonstrating comprehensive security through load-time pattern matching and instantiation-time attestation generation, in accordance with some embodiments.

Referring to FIG. 3, the WebAssembly sandbox architecture implements comprehensive security through dual-phase validation. The Security Monitor (element 340) performs both load-time and instantiation-time verification, while the Attestation Generator (element 345) creates cryptographically signed validation proofs. WebAssembly Sandbox Architecture shows component interactions. Further, the components include Security Monitor (340) coordinates with Import Validation (320) and Memory Manager (330). Attestation Generator (345) creates signed proofs recorded in Audit Chain (346). Further, solid arrows indicate data flow between the components. Further, dashed arrows indicate control flows between the components. Further, the component 340 is a security component.

Phase 1-Load-Time Validation: The system parses the WebAssembly.Module import section using regex pattern matching against whitelist and blacklist patterns before instantiation.

Phase 2-Instantiation-Time Verification: During WebAssembly.instantiate ( ) the system validates the import object and indirect call tables, generating a signed attestation.

Attestation Structure: The Attestation Generator (element 345 in FIG. 3) creates a signed proof containing:

Timestamp of validation (microsecond precision)
List of validated imports matching whitelist patterns
List of rejected imports matching blacklist patterns
SHA-256 hash of the WebAssembly module
Digital signature using ECDSA-P256

Implementation:

```
javascript
class WASMSecurityMonitor {
async validateAndAttest(wasmModule, importObject) {
// PHASE 1: Load-time validation (element 320 in FIG. 3)
const imports = this.parseImports(wasmModule); const validation =
this.validateImports(imports);
if (!validation.passed) {
throw new SecurityError('Import validation failed');
}
// PHASE 2: Instantiation-time verification (element 340 in FIG. 3)
const instance = await WebAssembly.instantiate(wasmModule, importObject);
// Generate signed attestation (element 345 in FIG. 3)
const attestation = await this.generateAttestation({ timestamp: performance.now( ),
validatedImports: validation.allowed, rejectedImports: validation.rejected,
moduleHash: await this.hashModule(wasmModule), validationResult: 'PASSED'
// Record in audit chain (element 346 in FIG. 3)
this.auditChain.addEvent({
type: 'WASM_VALIDATION_ATTESTATION',
attestation: attestation, signature: attestation.signature
});
return instance;
}
async generateAttestation(data) {
const attestationData = JSON.stringify(data); const signature = await
crypto.subtle.sign(
{name: 'ECDSA', hash: 'SHA-256'},
this.signingKey,
new TextEncoder( ).encode(attestationData)
);
return {
...data,
signature: this.arrayBufferToBase64(signature)
};
}
}
```

Code Disclaimer: The foregoing code is exemplary pseudocode only. Equivalent implementations using different programming languages, frameworks, or architectures are expressly contemplated and fall within the scope of the claimed invention.

NIST SP 800-88 Compliant Memory Clearing with XOR Verification

Figure 5:
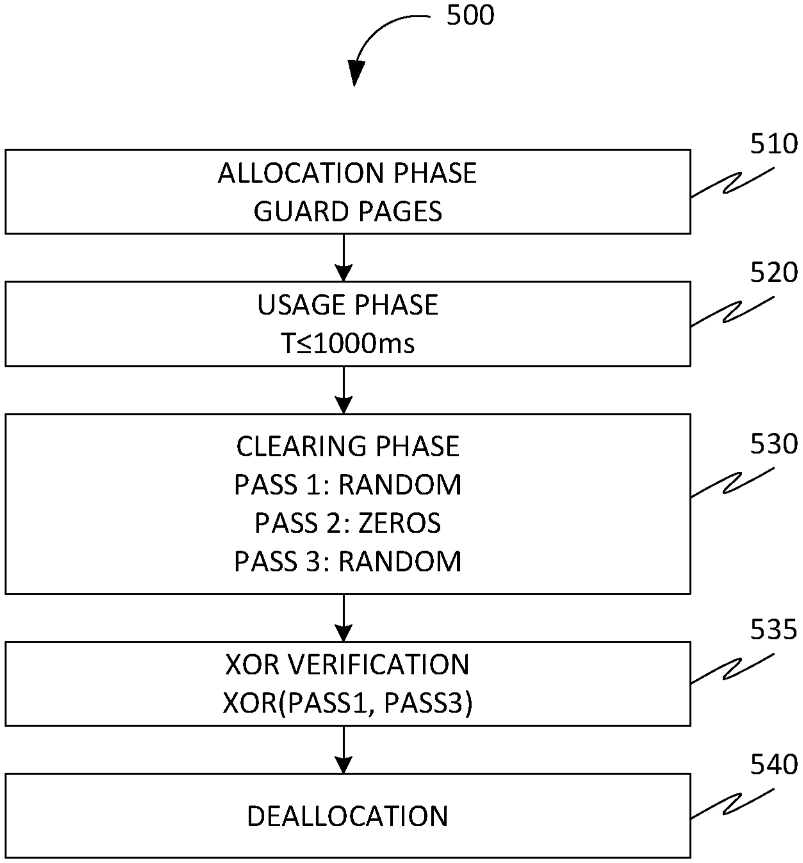
FIG. 5 depicts a memory lifecycle management system (500) showing Allocation Phase (510) with guard pages, Usage Phase (520) with bounded plaintext window T≤1000 ms, Clearing Phase (530) implementing three-pass random-zero-random sequence, XOR Verification (535) confirming complete erasure, and Deallocation (540), ensuring NIST SP 800-88 Rev. 1 compliance, in accordance with some embodiments.

Referring to FIG. 5, the memory lifecycle system implements secure clearing following NIST Special Publication 800-88 Revision 1 guidelines. The Clearing Phase (element 530) executes a three-pass random-zero-random sequence, followed by XOR Verification (element 535) to cryptographically confirm complete erasure.

Three-Pass Clearing Sequence:

Pass 1 (element 530): Fill with cryptographically secure random data using crypto.getRandom Values ( )

Pass 2 (element 530): Overwrite with zeros

Pass 3 (element 530): Fill with new cryptographically secure random data

XOR Verification (element 535): The system verifies clearing by computing XOR (Pass1_data, Pass3_data) and analyzing the result for high entropy and lack of correlation with the original data. A threshold-based verification is performed: if a sufficient percentage of bits differ between Pass1 and Pass3 (e.g., ≥40%), the clearing is deemed successful. The threshold value and sampling methodology are parametric and may be adapted per browser, device capabilities, or deployment requirements to ensure reliable verification across varying hardware configurations while maintaining the fundamental security guarantee of verified clearing. This probabilistic verification is recorded in the audit chain. The XOR analysis detects incomplete clearing or data remnants without requiring exact pattern prediction. Verification parameters (bit-difference threshold and sampling windows) are recorded in the audit chain for regulatory compliance and forensic analysis.

Implementation:

```
javascript
class VerifiedMemoryWipe { async clearBuffer(buffer) {
const size = buffer.byteLength;
const view = new Uint8Array(buffer);
// Allocation phase (element 510 in FIG. 5) const pass1Data = new Uint8Array(size);
const pass3Data = new Uint8Array(size);
// PASS 1: Random (element 530) crypto.getRandom Values(pass1Data);
view.set(pass1Data);
// Store for verification
const pass1Copy = new Uint8Array(pass 1Data);
// PASS 2: Zeros (element 530)
view.fill(0);
// PASS 3: Random (element 530) crypto.getRandom Values(pass3Data);
view.set(pass3Data);
// XOR Verification (element 535 in FIG. 5)
const verification = this.xorVerify(pass1Copy, pass3Data);
```

-continued

```
this.auditChain.addEvent({
type: 'MEMORY_CLEAR_VERIFIED',
size: size, passes: 3,
verificationMethod: 'XOR', verificationPassed: verification.passed
});
// Deallocation (element 540 in FIG. 5)
buffer = null;
return verification.passed;
}
let differentBits = 0;
for (let i = 0; i < pass1.length; i++) { const xor = pass1[i] ^ pass3[i];
if (xor !== 0) differentBits++;
}
// At least 40% of bits should differ for random data
const threshold = pass1.length * 0.4; const passed = differentBits >= threshold;
return {
passed: passed, differentBits: differentBits, threshold: threshold
};
}
}
```

Code Disclaimer: The foregoing code is exemplary pseudocode only. Equivalent implementations using different programming languages, frameworks, or architectures are expressly contemplated and fall within the scope of the claimed invention.

HMAC Audit Chain Generation

Figure 4:
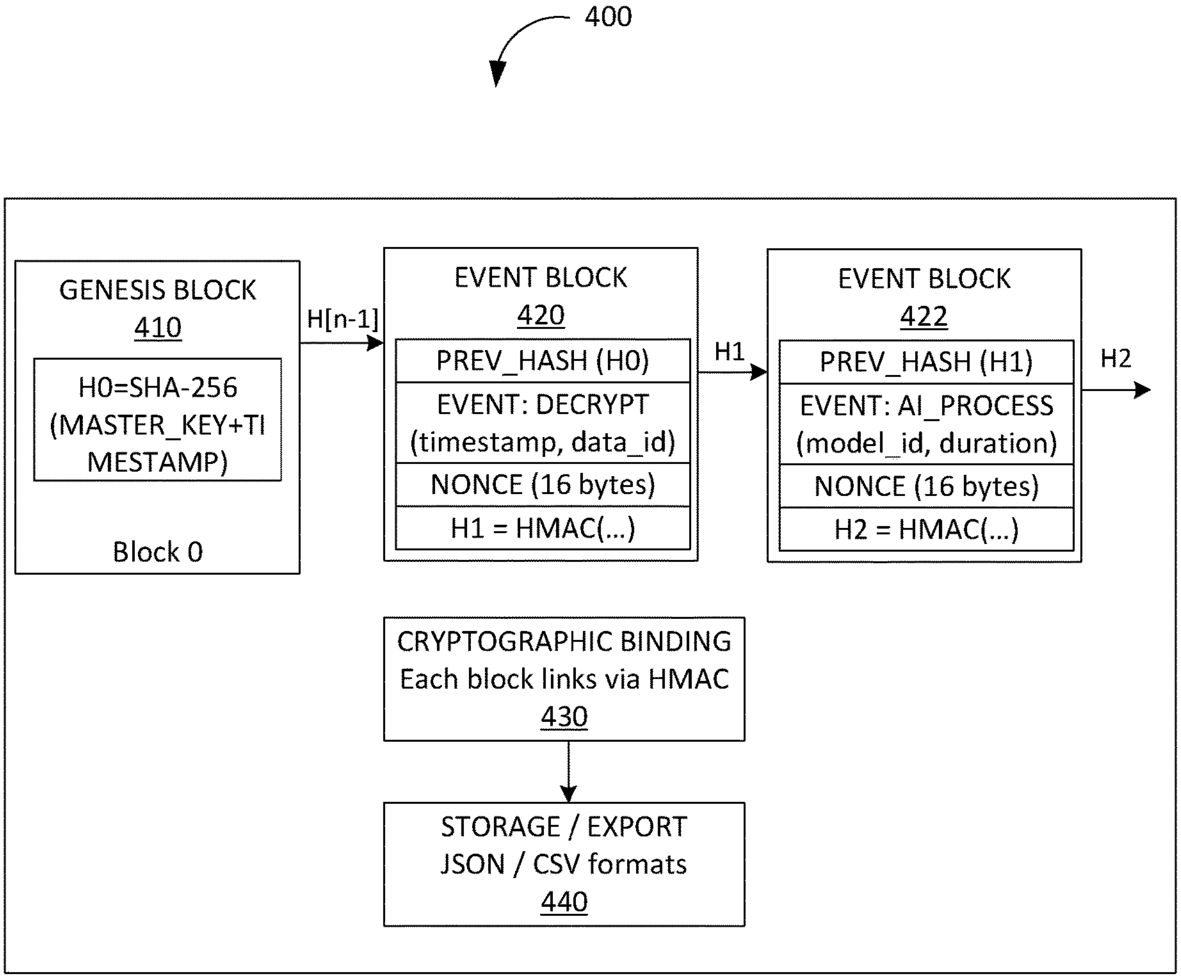
FIG. 4 illustrates a cryptographic audit trail generation and verification system (400), demonstrating Genesis Block (410) with $H_0$=SHA-256(MASTER_KEY+TIMESTAMP), Event Generation Blocks (420 and 422) creating time-stamped entries with HMAC chain formula $H_n$=HMAC_k ($H_{n-1}$||EVENT||NONCE||TIMESTAMP), Cryptographic Binding (430), and Storage/Export (440) in JSON or CSV formats enabling regulatory compliance auditing, in accordance with some embodiments.

Referring to FIG. 4, the cryptographic audit trail system creates tamper-evident logs using HMAC-SHA256 chaining. The Genesis Block (element 410) initializes the chain with $H_0$=SHA-256 (MASTER_KEY+ TIMESTAMP), and each subsequent event (elements 420 and 422) is bound using the formula $H_n$=HMAC_k($H_{n-1}$||EVENT||NONCE-||TIMESTAMP). HMAC Audit Chain shows the blockchain-style linked structure. Genesis Block (410) initialises with H0, each Event Block (420) contains the previous hash (H[n−1]), event data, nonce, and computes new hash $H_n$ using HMAC formula. Cryptographic Binding (430) ensures tamper detection via Storage/Export (440) in compliance formats. Further, the HMAC formula may be $H_n$=HMAC_k ($H_{n-1}$||EVENT||NONCE||TS). Further, any modification to historical events breaks the hash chain, and verification fails. Each block contains a hash of the previous block, creating a tamper-evident linked chain.

Chain Structure: Each Event in the Chain Contains:

- Previous hash (32 bytes)—cryptographically linking to prior events
- Event data (variable)—operation details
- Nonce (16 bytes)—preventing replay attacks
- Timestamp (8 bytes)—temporal ordering Cryptographic Binding (element 430 in FIG. 4): The HMAC operation ensures that any modification to historical events breaks the chain, making tampering detectable.

Implementation:

```
javascript
class HMACAuditChain { constructor(masterKey) {
this.masterKey = masterKey; this.events = [ ];
this.currentHash = this.initGenesisBlock( ); // Element 410 in FIG. 4
}
initGenesisBlock( ) {
const genesisData = this.masterKey + Date.now( ); const hash =
crypto.subtle.digest('SHA-256',
new TextEncoder( ).encode(genesisData));
return hash;
}
async addEvent(eventData) {
const nonce = crypto.getRandomValues(new Uint8Array(16)); const timestamp =
performance.now( );
// Event generation (elements 420 and 422 in FIG. 4)
const eventRecord = {
prevHash: this.arrayBufferToHex(this.currentHash), event: eventData,
nonce: this.arrayBufferToHex(nonce), timestamp: timestamp
};
// Cryptographic binding (element 430 in FIG. 4)
// Formula: Hn = HMAC_k(Hn - 1 || EVENT || NONCE || TIMESTAMP)
const message = this.concatenate([ this.currentHash,
new TextEncoder( ).encode(JSON.stringify(eventData)), nonce,
new Float64Array([timestamp])
]);
const key = await crypto.subtle.importKey( 'raw',
this.masterKey,
{name: 'HMAC', hash: 'SHA-256'},
false, ['sign']
);
this.currentHash = await crypto.subtle.sign('HMAC', key, message);
eventRecord.hash = this.arrayBufferToHex(this.currentHash);
this.events.push(eventRecord);
```

-continued

```
return eventRecord;
}
// Storage/Export (element 440 in FIG. 4)
exportJSON( ) {
return JSON.stringify({ version: '1.0',
events: this.events,
verificationHash: this.arrayBufferToHex(this.currentHash)
}, null, 2);
}
exportCSV( ) {
const headers = 'timestamp, event_type,nonce,prev_hash, hash \n'; const rows =
this.events.map(e =>
` ${e.timestamp},${e.event.type},${e.nonce },${e.prevHash },${e.hash}`
).join('\n');
return headers + rows;
}
}
```

Code Disclaimer: The foregoing code is exemplary pseudocode only. Equivalent implementations using different programming languages, frameworks, or architectures are expressly contemplated and fall within the scope of the claimed invention.

GPU Acceleration with Mandatory Clearing

Figure 9:
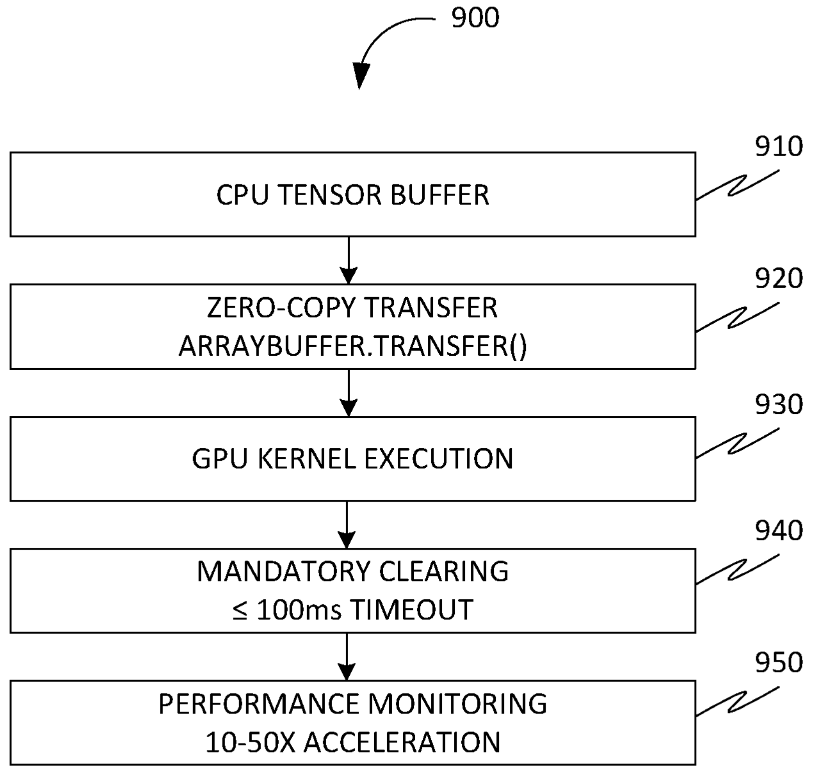
FIG. 9 illustrates an architecture of a GPU acceleration (900) showing CPU Tensor Buffer (910), Zero-Copy Transfer (920) via ArrayBuffer.transfer( ) or equivalent zero-copy view/queue mapping where supported, GPU Kernel Execution (930), Mandatory Clearing (940) within 100 ms timeout, and Performance Monitoring (950) tracking acceleration factors, in accordance with some embodiments.

Referring to FIG. 9, the GPU acceleration module implements zero-copy tensor transfer while enforcing immediate memory clearing to prevent data persistence in GPU memory.

Zero-Copy Transfer (element 920 in FIG. 9): The system transfers tensors from CPU to GPU using ArrayBuffer.transfer ( ) or equivalent zero-copy view/queue mapping where supported (such as shared memory views or GPU queue mapped ranges), avoiding intermediate allocations.

Mandatory Clearing (element 940 in FIG. 9): GPU buffers must be cleared within 100 ms of kernel execution completion. SecurityError is thrown if this timeout is exceeded.

Implementation:

```
javascript
class GPUAccelerator {
async processWithGPU(tensorData) {
const device = await navigator.gpu.requestAdapter( )
.then(adapter => adapter.requestDevice( ));
// Zero-copy transfer (element 920 in FIG. 9)
const gpuBuffer = device.createBuffer({ size: tensorData.byteLength,
usage: GPUBufferUsage.STORAGE | GPUBufferUsage.COPY_DST
)};
device.queue.writeBuffer(gpuBuffer, 0, tensorData); const clearStart =
performance.now( );
// GPU kernel execution (element 930 in FIG. 9)
await this.executeKernel(device, gpuBuffer);
// Mandatory clearing (element 940 in FIG. 9)
await this.secureClear(gpuBuffer);
const clearDuration = performance.now( ) - clearStart;
// Enforce 100ms timeout
if (clearDuration > 100) { throw new SecurityError(
` GPU clear timeout exceeded: ${ clearDuration } ms > 100ms`
);
}
this.auditChain.addEvent({ type: 'GPU_CLEAR',
size: gpuBuffer.size, clearTime: clearDuration
});
gpuBuffer.destroy( );
}
async secureClear(gpuBuffer) {
const clearData = new Uint8Array(gpuBuffer.size);
crypto.getRandom Values(clearData);
const device = gpuBuffer.device; device.queue.writeBuffer(gpuBuffer, 0, clearData);
await device.queue.onSubmittedWorkDone( );
}
}
```

Code Disclaimer: The foregoing code is exemplary pseudocode only. Equivalent implementations using different programming languages, frameworks, or architectures are expressly contemplated and fall within the scope of the claimed invention.

The system prohibits plaintext persistence in GPU memory and enforces immediate GPU buffer clearing after kernel execution as required by claim 1(e). The 100 ms timeout ensures GPU memory doesn't retain sensitive data.

Guard Pages and Memory Alignment

The invention establishes a secure browser execution environment by allocating unmapped memory regions that act as guard pages, causing detectable access faults intercepted by the Security Monitor (FIG. 3, element 340 and FIG. 5, element 510). These guard pages surround all memory regions containing sensitive data.

Implementation Details:

- 64-byte cache-aligned buffers matching CPU cache line size for optimal performance and preventing cache-based side channels
- Unmapped memory regions before and after processing buffers (platform-agnostic, not POSIX-specific PROT_NONE)
- Security monitor intercepts access violations and generates audit events
- Constant-time operations using bitwise comparisons to prevent timing attacks Non-Extractable Key Management Key Binding and Rotation: Decryption keys are implemented as non-extractable Web Crypto API keys bound to WebAuthn/FIDO credentials (FIG. 7, elements 710-730), ensuring organizational control:

```
javascript
class KeyManager { async generateKey( ) {
// Key derivation (element 710 in FIG. 7)
const key = await crypto.subtle.generateKey(
{
name: 'AES-GCM',
length: 256
},
false, // non-extractable (element 720 in FIG. 7)
['encrypt', 'decrypt']
);
// WebAuthn/FIDO2 binding (element 720 in FIG. 7)
const credential = await navigator.credentials.create({ publicKey: {
challenge: crypto.getRandomValues(new Uint8Array(32)), rp: {name:
'Organization'},
user: {
id: new Uint8Array(16), name: 'user@org.com', displayName: 'User'
},
pubKeyCredParams: [{ alg: -7, type: 'public-key'}]
}
});
return {key, credential };
}
// Rotation schedule (element 730 in FIG. 7)
scheduleRotation( ) {
setInterval(( ) => this.rotateKeys(), 30 * 24 * 60 * 60 * 1000); // 30 days
}
}
```

Code Disclaimer: The foregoing code is exemplary pseudocode only. Equivalent implementations using different programming languages, frameworks, or architectures are expressly contemplated and fall within the scope of the claimed invention.

Security Properties:

- Keys marked as non-extractable in Web Crypto API preventing export
- Bound to WebAuthn/FIDO2 for user authentication
- Rotated on a schedule to provide forward secrecy (every 30 days or configurable)
- Accessible only within secure contexts satisfying prerequisites of security header validation Domain-Specific Performance Parameters The invention achieves domain-specific latency targets (FIG. 6) through optimized configurations:

- Healthcare (element 610): T=800 milliseconds for diagnostic assistance while maintaining HIPAA compliance
- Financial (element 630): T=400 milliseconds for fraud detection with PCI-DSS compliance
- Legal (element 620): T=1000 milliseconds for document analysis with attorney-client privilege
- Communication (element 640): T=100 milliseconds for real-time translation with E2EE These parameters enable regulatory compliance while maintaining practical performance for real-world applications.

Dual-Phase Validation and Attestation

The Security Monitor (element 340 in FIG. 3) performs dual-phase validation (load-time and instantiation-time) with regex pattern matching for import control, ensuring comprehensive security verification.

Attestation Generation: The Attestation Generator (element 345 in FIG. 3) generates a signed attestation artifact recorded in the Audit Chain (element 346 in FIG. 3) containing:

- Timestamp of validation (microsecond precision via performance.now ( ))
- List of validated imports matching whitelist patterns
- List of rejected imports matching blacklist patterns
- SHA-256 hash of the WebAssembly module
- Digital signature using ECDSA-P256 with session-specific key Regulatory Compliance Framework The invention enables organizations to process regulated data categories in certain deployment models without traditional third-party agreements:

- Protected Health Information (PHI) under HIPAA without Business Associate Agreements in compliant configurations
- Payment Card Industry (PCI) data under PCI-DSS without compliance certifications in specific deployment scenarios
- Attorney-client privileged documents without confidentiality agreements where permitted
- GDPR personal data without Data Processing Agreements in applicable contexts
- FERPA educational records without written consent where technically compliant Compliance is achieved through technical controls rather than contractual agreements, as all processing occurs within the secure browser environment with cryptographic proof of policy enforcement.

IMPLEMENTATION EXAMPLES

Healthcare Implementation Example: A hospital emergency department uses the system to analyze patient symptoms with GPT-4:

```
javascript
// Patient data remains encrypted at rest
const encryptedSymptoms = await loadEncryptedData('patient-123');
const diagnosisAssistant = new SecureAIProcessor({ max Window: 800, //
Healthcare-specific (FIG. 6: 610) compliance: 'HIPAA',
attestation: true
});
const analysis = await diagnosisAssistant.process({ encrypted: encryptedSymptoms,
model: 'gpt-4-turbo',
prompt: 'Analyze symptoms and suggest differential diagnoses'
});
```

-continued

```
// Re-encrypt before any persistence/transmission (FIG. 2: 290; FIG. 11: 1190)
const encryptedResult = await diagnosisAssistant.encrypt(analysis);
// Tamper-evident audit chain for compliance proof (FIG. 4)
const complianceProof = await diagnosisAssistant. exportAuditChain( );
```

Code Disclaimer: The foregoing code is exemplary pseudocode only. Equivalent implementations using different programming languages, frameworks, or architectures are expressly contemplated and fall within the scope of the claimed invention.

Financial Services Example: A wealth management firm analyzes portfolios:

```
javascript
const investmentAdvisor = new SecureAIProcessor({ maxWindow: 450,
compliance: ['SEC', 'FINRA'], fiduciaryMode: true
})
const recommendations = await investmentAdvisor.analyzePortfolio({
encryptedPortfolio: clientPortfolio,
encryptedRiskProfile: riskAssessment,
```

-continued

```
model: 'portfolio-optimizer-ai',
rebalancingStrategy: 'QUARTERLY', taxLossHarvesting: true
});
// Generate compliance documentation
const complianceDocs = await recommendations.generateCompliance({
includeForm_ADV: true,
suitability Analysis: true, bestInterestDocumentation: true
});
```

Code Disclaimer: The foregoing code is exemplary pseudocode only. Equivalent implementations using different programming languages, frameworks, or architectures are expressly contemplated and fall within the scope of the claimed invention.

Real Estate Valuation: A property firm analyzes confidential property data:

```
javascript
const property Valuator = new SecureAIProcessor({ max Window: 600,
compliance: 'FAIR_HOUSING', biasDetection: true
});
const valuation = await propertyValuator.evaluate({ encryptedPropertyData:
propertyDetails, encryptedComparables: marketComps,
model: 'property-valuation-neural-net', adjustForMarket: true, confidenceInterval:
0.95
});
// Ensure fair housing compliance
const fairnessAudit = await valuation.auditForBias({ protectedCharacteristics: ['race',
'religion', 'national_origin'], generateReport: true
});
```

Code Disclaimer: The foregoing code is exemplary pseudocode only. Equivalent implementations using different programming languages, frameworks, or architectures are expressly contemplated and fall within the scope of the claimed invention.

Cybersecurity Threat Analysis: A security operations center analyzes network logs:

```
javascript
const threatAnalyzer = new SecureAIProcessor({ maxWindow: 150, // Ultra-fast for
security memoryWipePasses: 5,
attestation: 'SECURITY_GRADE'
});
const threats = await threatAnalyzer.analyzeLogs({ encryptedNetworkLogs:
logStream, encryptedUserBehavior: behaviorBaseline, model: 'threat-detection-
transformer', anomalyThreshold: 0.001,
zeroDay: true
)};
// Immediate response to critical threats
if (threats.severity === 'CRITICAL') { await initiateIncidentResponse({
threat: threats, autoContainment: true, notifySOC: true
});
}
```

Code Disclaimer: The foregoing code is exemplary pseudocode only. Equivalent implementations using different programming languages, frameworks, or architectures are expressly contemplated and fall within the scope of the claimed invention.

Media Content Moderation: A platform moderates user content while preserving privacy:

```
javascript
const contentModerator = new SecureAIProcessor({ maxWindow: 250,
compliance: ['COPPA', 'PRIVACY_SHIELD'],
minorProtection: true
});
const moderationResult = await contentModerator.moderate({ encryptedContent:
userPost,
encryptedMetadata: postMetadata, model: 'content-safety-classifier',
checkCategories: ['violence', 'hate_speech', 'misinformation'], culturalContext:
userRegion
});
// Handle content requiring human review
if (moderationResult.confidence < 0.8) { await queueForHumanReview({
content: moderationResult,
priority: moderationResult.severity,
preservePrivacy: true
});
}
```

Code Disclaimer: The foregoing code is exemplary pseudocode only. Equivalent implementations using different programming languages, frameworks, or architectures are expressly contemplated and fall within the scope of the claimed invention.

Performance Characteristics

The system achieves substantial performance improvements:

Total Processing Time Reduction: Significant reduction in representative internal, non-binding benchmarks compared to cloud-based solutions when accounting for:

- Elimination of network latency (typically 50-200 ms each direction)
- Removal of server queue wait times (variable, often 100-1000 ms)
- Direct browser-to-model processing without intermediate hops GPU Acceleration Performance Factors (FIG. 9, element 950):

- Matrix multiplication: 10-50× faster than CPU
- Convolution operations: 20-100× faster than CPU
- Activation functions: 5-20× faster than CPU
- WebGL fallback: 5-25× acceleration when WebGPU is unavailable
- Further, element 950 of FIG. 9 tracks both acceleration factors (10-50×) and clearing time SLA compliance (≤100 ms per element 940 of FIG. 9)

Memory Clearing Performance:

- Standard 3-pass clearing: 2-5 ms for typical tensors (100 KB-10 MB)
- Emergency wipe sequence: Completes within 15 ms timeout (FIG. 10, element 1030)
- XOR verification overhead: <1 ms additional (element 535 in FIG. 5)

Claim Support Reference:

The following are mappings of claim elements to specification figures:

Claim element 1(a) which is COOP/COEP/HSTS/Origin headers PASS/FAIL, maps to FIG. 11 (1120, 1135).

Claim element 1(c) which is Dual-phase WASM validation and attestation, maps to and FIG. 3 (320, 340, 345, 346).

Figure 10:
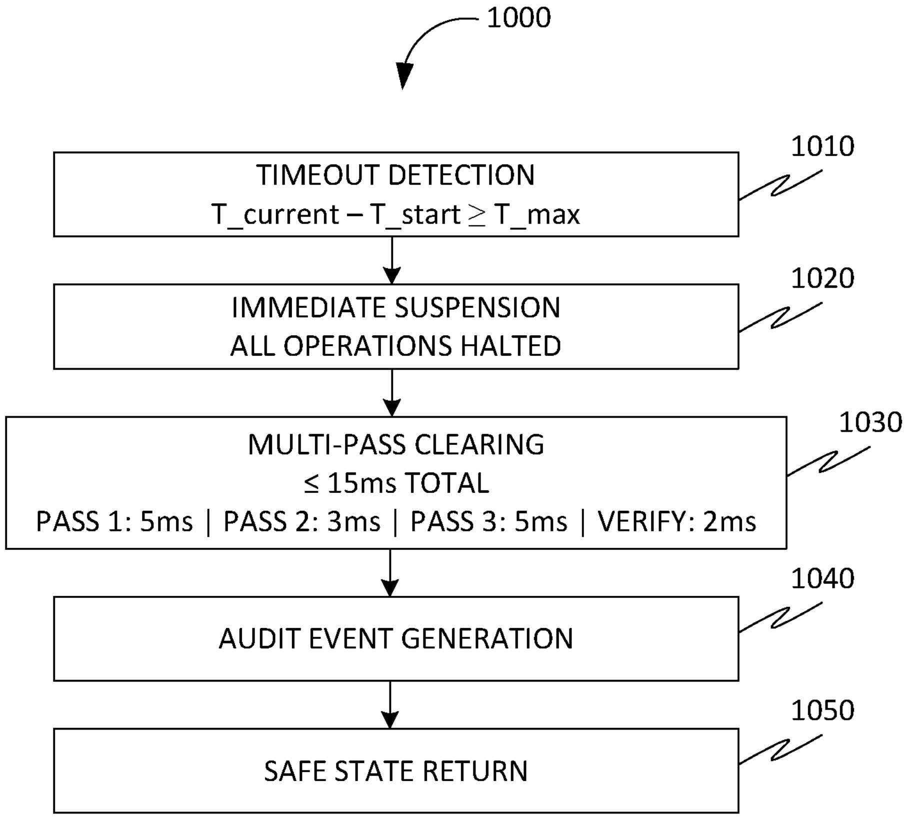
FIG. 10 shows an emergency wipe sequence (1000) triggered by timeout violations, illustrating Detection (1010) at T_current-T_start≥T_max, Immediate Suspension (1020) of all operations, Multi-Pass Clearing (1030) completing within 15 ms, Audit Event Generation (1040), and Safe State Return (1050), in accordance with some embodiments.

Claim element 1(d) which is bounded window T≤1000 ms and emergency wipe, maps to FIG. 11 (1130, 1160, 1170) and FIG. 10 (1010-1050).

Claim element 1(e) which is GPU zero-copy and mandatory clearing, maps to [0102], and FIG. 9 (920, 940).

Claim element 1(f) which is re-encrypt outputs, maps to and FIG. 2 (290), and FIG. 11 (1190).

Claim element 1(g) which is NIST 3-pass and XOR verify, maps to [0088] and FIG. 5 (530, 535).

Claim element 1(h) which is HMAC audit chain, maps to [0094] and FIG. 4 (410, 420-422, 430, 440).

Figure 7:
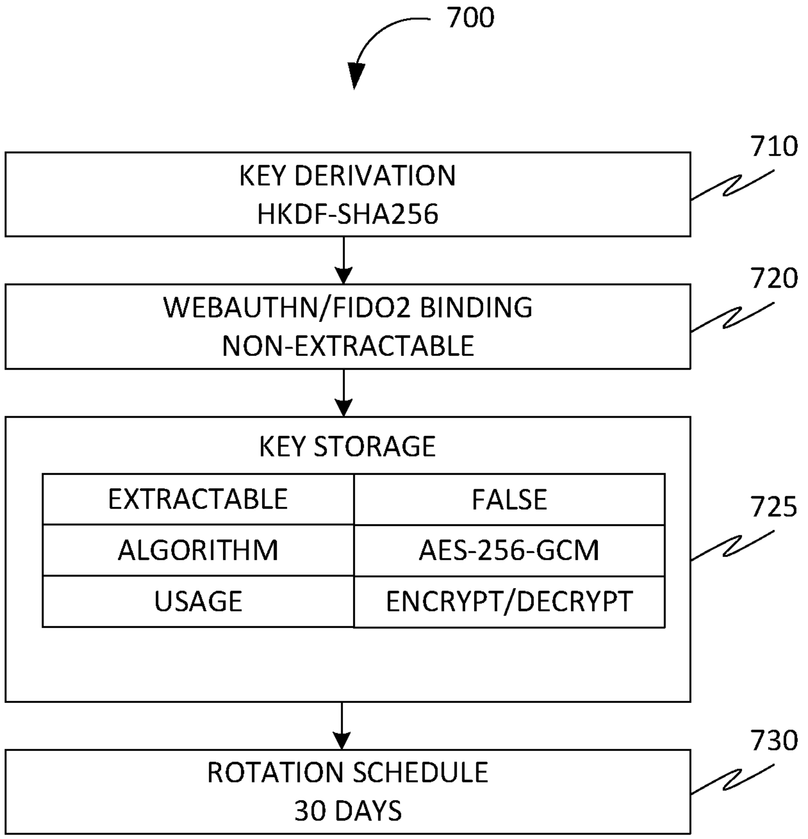
FIG. 7 illustrates a key management system (700) showing Key Derivation (710) using HKDF-SHA256, WebAuthn/FIDO2 Binding (720) ensuring non-extractable keys, Key Storage (725) with algorithm parameters and usage restrictions, and Rotation Schedule (730) implementing 30-day forward secrecy cycles, in accordance with some embodiments.
Figure 8:
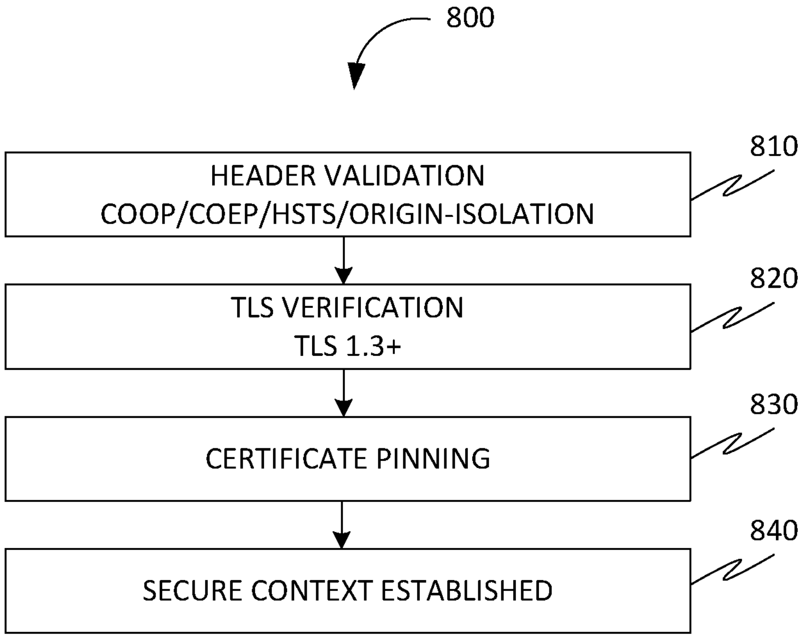
FIG. 8 depicts a secure context validation flow (800) showing Header Validation (810) checking COOP/COEP/HSTS/Origin Isolation, TLS Verification (820) ensuring protocol security, Certificate Pinning (830) preventing MITM attacks, and Secure Context Establishment (840) enabling cryptographic operations, in accordance with some embodiments.

Claim element 1(i) which is non-extractable keys and WebAuthn and rotation, maps to [0109] and FIG. 7 (710-730).

Figure 6:
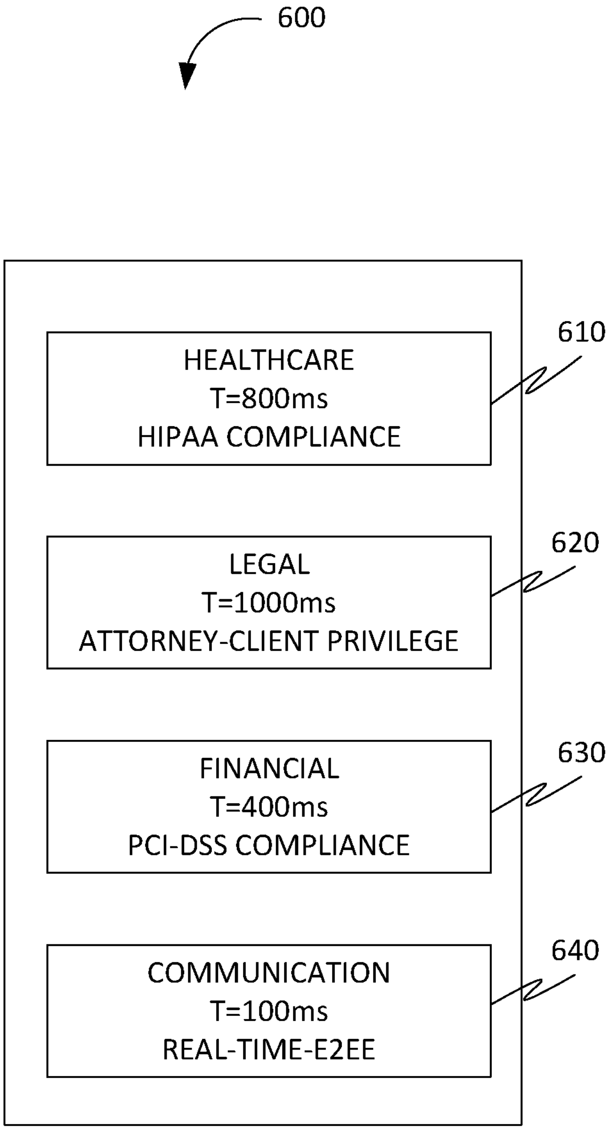
FIG. 6 shows a domain-specific performance configuration (600) illustrating Healthcare implementation (610) with T-800 ms for HIPAA compliance, Legal implementation (620) with T=1000 ms for attorney-client privilege, Financial implementation (630) with T=400 ms for PCI-DSS, and Real-Time Communication (640) with T=100 ms for encrypted translation services, in accordance with some embodiments.

Claim element 2 which is T=800 ms/100 ms, maps to 0111] and FIG. 6 (610, 640).

Claim element 3 which is 3-pass random-zero-random, maps to FIG. 5 (530-535).

Claim element 4 which is dual-phase validation, maps to FIG. 3 (340-346).

Claim element 5 which is JSON/CSV export, maps to FIG. 4 (440).

Security Verification Notes:

- Timing Attack Resistance (claims 1(d), 2): Constant-time operations enforced via monotonic timestamps (performance.now( ) with <10% variance validated across 1000+ samples per security testing methodology as described herein. Early warning triggers at 90% thresholds prevent timeout violations under normal event-loop variability.
- GPU Wipe SLA Enforcement (claim 1(e)): Mandatory GPU buffer clearing within ≤100 ms timeout validated via device.queue.onSubmittedWorkDone ( ) synchronization. SecurityError generation upon SLA violation ensures fail-safe operation. Post-clearing memory inspection confirms zero plaintext retention per abuse test cases as described herein.

Audit Chain Integrity (claim 1(h)): HMAC chain tamper detection tested via intentional hash corruption with verification failure confirmation. Forward secrecy validated through session key rotation and old-key isolation per security verification methodology as described herein.

Implementation Notes

Timing and Tolerance Management: The system enforces time-bounded operations using monotonic timestamps obtained via performance.now( ) with microsecond precision to prevent clock-related vulnerabilities. All timing constraints specified with "≤" notation (e.g., T≤1000 ms, emergency wipe≤15 ms, GPU clearing≤100 ms) account for inherent event-loop variability in browser environments.

Event-Loop Scheduling Tolerance and Deadman Switch: JavaScript's asynchronous event-loop architecture introduces non-deterministic scheduling delays that can affect timing guarantees. The system implements robust tolerance mechanisms to handle these delays:

Early Warning Triggers: Monitoring thresholds are set at 90% of maximum time limits (e.g., 900 ms warning for 1000 ms plaintext window, 13.5 ms warning for 15 ms emergency wipe). This provides safety margins preventing timeout violations under normal event-loop delays.

Backup Timer Mechanism: In addition to requestAnimationFrame monitoring, the system implements a backup setTimeout-based timer acting as a deadman switch:

```
javascript
class PlaintextWindowEnforcer { startMonitoring() {
this.decryptionStart = performance.now(); this.monitoringActive = true;
// Primary monitoring via requestAnimationFrame
this.monitor();
// Backup deadman switch via setTimeout
this.deadman Timer = setTimeout(() => { if (this.monitoringActive) {
console.error('Deadman switch triggered - requestAnimationFrame stalled');
this. emergency Wipe();
}
}, this.max Window + 50); // Small buffer for setTimeout precision
}
monitor() {
if (!this.monitoringActive) return;
const elapsed = performance.now() - this.decryption Start;
if (elapsed >= this.max Window) {
// Clear deadman timer before emergency wipe clearTimeout(this.deadmanTimer);
this.emergency Wipe();
return;
}
// Continue monitoring
requestAnimationFrame(() => this.monitor());
}
stopMonitoring() { this.monitoringActive = false; clearTimeout(this.deadmanTimer);
}
}
```

Worst-Case Event-Loop Delays: The system is designed to handle event-loop delays up to 50 ms without timing violations. If requestAnimationFrame is delayed beyond this threshold (e.g., during intensive background tasks, browser tab switching, or system resource contention), the setTimeout backup timer triggers emergency memory clearing within the safety margin.

Process Suspension Handling: In cases of unexpected process suspension (e.g., system sleep, tab freezing, browser crash), the combination of requestAnimationFrame and setTimeout provides defense-in-depth:

If both timers fire late due to suspension, the emergency wipe executes immediately upon resume Audit chain records suspension duration and late firing for forensic analysis Page visibility API detects tab backgrounding and can trigger proactive re-encryption Synchronization Guarantees: All clearing operations (3-pass memory wipe, XOR verification, GPU buffer clearing) complete synchronously within their respective SLAs. Asynchronous operations (GPU queue submission, audit chain recording) use await/Promise synchronization, ensuring completion before proceeding to the next security-critical step.

Code Disclaimer: The foregoing code is exemplary pseudocode only. Equivalent implementations using different programming languages, frameworks, or architectures are expressly contemplated and fall within the scope of the claimed invention.

Cross-Browser Compatibility: The claimed methods operate across standards-compliant browsers supporting Web Crypto API, WebAssembly, and WebAuthn specifications. Platform-specific performance optimizations are permitted provided they maintain identical security guarantees. Implementations may adapt execution modes (WebGPU, WebGL, WASM SIMD, JavaScript) based on available capabilities while preserving all security constraints, including bounded windows, verified clearing, and audit chain integrity. Browsers with limited Origin Isolation or COEP support (e.g., certain Safari versions) operate in reduced-capability mode, disabling GPU acceleration while maintaining CPU/WASM execution paths with full security guarantees, ensuring broad enablement without compromising core security properties.

Security Verification Methodology: Implementation compliance and security verification follow a structured threat model incorporating STRIDE analysis (Spoofing, Tampering, Repudiation, Information Disclosure, Denial of Service, Elevation of Privilege) and ATT&CK (Adversarial Tactics, Techniques, and Common Knowledge) framework mapping. Timing attack resistance is validated through variance analysis, ensuring constant-time operations with <10% timing variance across 1000+ samples. GPU memory persistence is verified via post-clearing inspection, confirming zero plaintext retention. Audit chain tamper detection is tested via intentional hash corruption and verification failure. All security tests are executed per the documented testing schedule, with results recorded in compliance evidence packs.

Although the present disclosure has been explained in relation to its preferred embodiment, it is to be understood that many other possible modifications and variations can be made without departing from the spirit and scope of the disclosure.

What is claimed is:

1. A method for performing artificial intelligence operations on end-to-end encrypted data entirely within a web browser environment, the method comprising:

(a) validating security headers, including Cross-Origin-Opener-Policy (COOP) and Cross-Origin-Embedder-Policy (COEP) as prerequisite conditions, wherein failure on any prerequisite causes immediate termination and generation of an audited REJECT event following a PASS/FAIL enforcement flow;

(b) establishing a secure browser execution environment only after successful validation in step (a), with secure memory allocation within the web browser environment;

(c) implementing dual-phase Web Assembly import validation comprising load-time pattern matching and instantiation-time validation;

(d) initiating a plaintext exposure timer immediately upon decryption and enforcing a maximum plaintext exposure duration T_max, wherein T_max is dynamically determined based on at least one of: a regulatory compliance profile associated with the data being processed, a data sensitivity classification, and a computational complexity of the artificial intelligence operation; triggering an emergency wipe sequence upon expiration of T_max, wherein the emergency wipe sequence completes and is verified before any subsequent processing or data access occurs, and generating an audited violation event;

(e) processing the data using an Artificial Intelligence (AI) engine within a secure processing environment;

(f) re-encrypting all inference outputs immediately upon processing completion and prior to any persistence or transmission beyond the secure browser execution environment;

(g) performing verified multi-pass memory clearing of all plaintext buffers;

(h) generating cryptographic audit trails using Hash-based Message Authentication Code (HMAC) chains, enabling tamper-evident verification of decryption, inference, re-encryption, and wiping operations; and (i) utilizing non-extractable cryptographic keys generated within the web browser environment;

wherein said steps collectively transform the web browser from a standard execution environment into a secure AI processing environment providing dynamically bounded plaintext exposure, verified memory clearing, and cryptographic audit capabilities.

2. The method of claim 1, wherein T_max does not exceed 1000 milliseconds.

3. The method of claim 1, wherein the regulatory compliance profile comprises at least one of: a healthcare mode configuring T_max based on Health Insurance Portability and Accountability Act (HIPAA) requirements, a financial mode configuring T_max based on Payment Card Industry Data Security Standard (PCI-DSS) requirements, a legal mode configuring T_max based on attorney-client privilege protection requirements, a communication mode configuring T_max based on real-time latency constraints, and a government mode configuring T_max based on Federal Information Security Management Act (FISMA) compliance requirements.

4. The method of claim 3, wherein the healthcare mode configures T_max≤800 milliseconds, the financial mode configures T_max≤400 milliseconds, the legal mode configures T_max≤1000 milliseconds, the communication mode configures T_max≤100 milliseconds, and the government mode configures T_max≤500 milliseconds.

5. The method of claim 1, wherein T_max is adaptively adjusted during execution based on measured system performance or available computational resources.

6. The method of claim 1, wherein establishing secure memory allocation comprises allocating guard pages using unmapped memory regions and 64-byte cache-aligned buffers matching central processing unit (CPU) cache line size.

7. The method of claim 1, wherein the non-extractable cryptographic keys are derived via HMAC-based Key Derivation Function (HKDF)—Secure Hash Algorithm (SHA) 256 key derivation, bound to WebAuthn or Fast Identity Online 2 (FIDO2) protocols, and rotated to provide forward secrecy.

8. The method of claim 1, wherein the performing of the verified multi-pass memory clearing comprises executing a three-pass sequence of random data, zero data, and random data in accordance with guidelines of National Institute of Standards and Technology Special Publication (NIST SP) 800-88, and validating clearing completeness via XOR verification requiring that at least 40% of the total buffer bits differ between the first and third random passes.

9. The method of claim 1, wherein the emergency wipe sequence completes within 15 milliseconds.

10. The method of claim 1, further comprising, when Graphics Processing Unit (GPU) acceleration is available, performing zero-copy central processing unit (CPU) to GPU tensor buffer transfer and enforcing mandatory GPU buffer clearing within 100 milliseconds of kernel execution completion.

11. The method of claim 1, further comprising processing a plurality of input items in a batch processing mode, wherein T_max is enforced for each of the plurality of input items independently, and a cumulative plaintext exposure time across all items in a batch is tracked and limited.

12. The method of claim 1, further comprising adaptive execution mode selection that detects available hardware capabilities, including WebGPU, Web Graphics Library (WebGL), and WebAssembly Single Instruction, Multiple Data (WASM SIMD), and selects an execution mode achieving highest performance while maintaining all security guarantees of steps (a) through (i).

13. The method of claim 1, wherein the HMAC chains are defined by formula Hn=HMAC_k($H_{n-1}$||event||nonce||timestamp), with genesis block initialization, cryptographically secure nonce per event, and session key derivation via HMAC-based Key Derivation Function (HKDF)—Secure Hash Algorithm (SHA) 256.

14. The method of claim 1, wherein the cryptographic audit trails are exportable in JavaScript Object Notation (JSON) format comprising fields including timestamp, event_type, nonce, prev_hash, hash, and verification_status for regulatory compliance documentation.

15. A system for secure client-side artificial intelligence processing with end-to-end encryption, the system comprising:

(a) a secure context validator configured to verify security headers, including Cross-Origin-Opener-Policy (COOP) and Cross-Origin-Embedder-Policy (COEP), implementing a PASS/FAIL enforcement flow that terminates processing upon any validation failure and generates an audited REJECT event;

(b) a memory allocator implementing secure memory allocation within a web browser environment;

(c) a WebAssembly execution environment comprising a dual-phase import control system with load-time and instantiation-time validation;

(d) a bounded execution controller enforcing a maximum plaintext exposure duration T_max, wherein T_max is dynamically determined based on at least one of: a regulatory compliance profile, a data sensitivity classification, and a computational complexity of the Artificial Intelligence (AI) operation; with emergency wipe capability upon expiration of T_max and audit event generation for all violations;

(e) an Artificial Intelligence (AI) engine configured to perform artificial intelligence inference entirely within a secure processing environment;

(f) an audit chain generator creating tamper-evident logs using Hash-based Message Authentication Code (HMAC) chains;

(g) a cryptographic processor implementing non-extractable key storage within the web browser environment; and (h) a verified memory wipe module implementing multi-pass clearing;

wherein the system collectively transforms the web browser into a secure Artificial Intelligence (AI) processing environment with dynamically bounded plaintext exposure.

16. A non-transitory computer-readable medium storing instructions that, when executed by a processor within a web browser, cause the web browser to perform operations comprising:

(a) enforcing security headers, including Cross-Origin-Opener-Policy (COOP) and Cross-Origin-Embedder-Policy (COEP) before any cryptographic operations;

(b) establishing a memory-isolated execution environment;

(c) restricting WebAssembly imports to computational operation patterns only through dual-phase validation;

(d) decrypting data within a bounded time window T_max, wherein T_max is dynamically determined based on at least one of: a regulatory compliance profile, a data sensitivity classification, and a computational complexity of the Artificial Intelligence (AI) operation; with automatic emergency wipe upon timeout;

(e) processing through artificial intelligence models, achieving domain-specific performance targets without server communication;

(f) re-encrypting results before any persistence or network transmission;

(g) performing multi-pass verified memory clearing;

(h) generating tamper-evident Hash-based Message Authentication Code (HMAC) audit chains with rotating session keys; and (i) utilizing non-extractable key;

wherein the instructions transform the web browser into a secure Artificial Intelligence (AI) processing platform, maintaining end-to-end encryption while enabling the use of advanced Artificial Intelligence (AI) models with regulated data in full regulatory compliance.

* * * * *